(12) United States Patent
Hanson et al.

(10) Patent No.: US 7,209,291 B2
(45) Date of Patent: Apr. 24, 2007

(54) OPTICAL DISPLACEMENT SENSOR

(75) Inventors: Steen Hanson, Fakse (DK); Bjarke Rose, Allerod (DK); Michael Linde Jakobsen, Frederiksberg C (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 10/503,716

(22) PCT Filed: Feb. 13, 2003

(86) PCT No.: PCT/DK03/00096

§ 371 (c)(1),
(2), (4) Date: Jan. 28, 2005

(87) PCT Pub. No.: WO03/069278

PCT Pub. Date: Aug. 21, 2003

(65) Prior Publication Data

US 2005/0128594 A1  Jun. 16, 2005

Related U.S. Application Data

(60) Provisional application No. 60/356,134, filed on Feb. 14, 2002.

(51) Int. Cl.
*G02B 27/10* (2006.01)
*G02J 1/04* (2006.01)
(52) U.S. Cl. .................... 359/619; 250/227.11
(58) Field of Classification Search ........... 359/619, 359/831, 566, 678; 356/28, 619, 623, 616, 356/614, 506; 250/227.11

See application file for complete search history.

(56) References Cited

U.S. PATENT DOCUMENTS 4,461,083 A * 7/1984 Ernst ..................... 33/707

(Continued)

FOREIGN PATENT DOCUMENTS

DE  44 14 287 A  10/1994

(Continued)

OTHER PUBLICATIONS

Aizu et al.; Principles and Development of Spatial Velocimetry; *Applied Physics B*; vol. 43; Springer-Verlag 1987; pp. 209-224.

(Continued)

*Primary Examiner*—Scott J. Sugarman
*Assistant Examiner*—M. Hasan
(74) *Attorney, Agent, or Firm*—Volentine & Whitt, P.L.L.C.

(57) ABSTRACT

The present invention relates to a compact and inexpensive optical displacement sensor that does not require accurate control of the distance to the object. A repetitive optical structure is utilized for formation of a repetitive optical signal emitted by an illuminated moving object. The repetitive optical structure is illuminated by the light source for formation of a fringe pattern (similar to Laser Doppler Anemometry), and/or, an object is illuminated by the light source and the repetitive optical structure diverts light from the illuminated object onto light sensors. A speckle pattern is formed on the object by the illumination. The speckle pattern moves with movement of the object, and speckle pattern movement is determined without a need for imaging the object onto the repetitive optical structure. Since the speckle pattern is not imaged onto the optical member, the distance and possible distance changes between the object and the optical member substantially do not affect system performance.

28 Claims, 38 Drawing Sheets

U.S. PATENT DOCUMENTS

| | | | | |
|---|---|---|---|---|
| 4,677,293 | A | * | 6/1987 | Michel .................. 250/237 G |
| 4,806,016 | A | * | 2/1989 | Corpron et al. ............. 356/620 |
| 5,004,345 | A | | 4/1991 | Hung ......................... 356/353 |
| 5,012,090 | A | * | 4/1991 | Spillman, Jr. ........... 250/237 G |

FOREIGN PATENT DOCUMENTS

| | | |
|---|---|---|
| DE | 44 14 287 A1 | 10/1994 |
| DE | 100 10 791 A1 | 6/2001 |
| DE | 100 10 791 A | 9/2001 |
| WO | WO 98/53271 | 11/1998 |
| WO | WO 03/069278 | 8/2003 |

OTHER PUBLICATIONS

Ushizaka et al.; Measurements of Velocity Using a Lenticular Grating; *Applied Physics B*; vol. 39; Springer-Verlag 1986; pp. 97-106.

Schnell et al.; Detection of Movement with Laser Speckle Patterns: Statistical Properties; *Journal Optical Society of America*; vol. 15; No. 1; Jan. 1998; pp. 207-216.

* cited by examiner

OPTICAL DISPLACEMENT SENSOR

This application claims the benefit of U.S. Provisional Application No. 60/356,134, filed on Feb. 14, 2002.

FIELD OF THE INVENTION

The present invention relates to a compact and inexpensive optical displacement sensor for determination of displacement of an object, such as linear displacement, angular displacement, vibration, etc.

BACKGROUND OF THE INVENTION

Provision of compact and inexpensive sensors for determination of movement of an object has been pursued for some time.

In Detection of movement with laser speckle patterns: statistical properties, Schnell et al., Vol. 15, No. 1, January 1998, J. Opt. Soc. Am., a sensor for determination of in-plane movement of a diffusing object is disclosed. The object is illuminated with coherent light and a speckle pattern is formed by interaction of the light with the surface of the object. Two interlaced differential comb photo detector arrays act as a periodic filter to the spatial-frequency spectrum of the speckle pattern intensity. The detector produces a zero-offset, periodic output signal versus displacement that permits measurement of the movement at arbitrarily low speed. The direction of the movement can be detected with a quadrature signal produced by a second pair of interlaced comb photo detector arrays.

In WO 98/53271, a sensor for determination of angular displacement of one or more parts of an object is disclosed. The determination is also based on speckle patterns and is independent of the distance to the object, any longitudinal and transversal movements, the shape of the object, and the radius of angular displacement.

In T. Ushizaka, Y. Aizu, and T. Asakura: "Measurements of Velocity Using a Lenticular Grating", Appl. Phys. B 39, 97–106 (1986), and Y. Aizu: "Principles and Development of spatial Filtering Velocimetry", Appl. Phys. B 43, 209–224 (1987), discloses utilization of a so-called lenticular grating for deflection of light scattered from a particle onto photo detectors. A particle traversing a measurement volume is illuminated by diffuse light from a He-Ne laser (5 mW) illuminating a ground glass placed at the measurement volume. It is a fundamental characteristic of the measurement system disclosed that the moving particle is imaged onto the lenticular grating. Thus, the distance between the lenticular grating and the moving particle has to be accurately controlled. Furthermore, a set of lenses is placed behind the lens array in order to adequately collect light onto the detectors. This eliminates the possibility for realizing a compact one-element optical system.

SUMMARY OF THE INVENTION

Thus, there is a need for a more compact and inexpensive displacement sensor, and a sensor that does not require accurate control of the distance to the object.

According to the present invention the above-mentioned and other objects are fulfilled by an optical displacement sensor system for detection of displacement of an object, comprising a coherent light source for illumination of at least part of the object with spatially coherent light, an optical member with at least three optical elements for mapping of different specific first areas in space onto substantially the same second area in space thereby generating an oscillating optical signal caused by phase variations of light emanating from the object moving in the first areas.

It is a fundamental aspect of the present invention that a repetitive optical structure, i.e. the optical member, is utilized for formation of a repetitive optical signal emitted by an illuminated moving object by 1) Illuminating the repetitive optical structure by the light source for formation of a fringe pattern (similar to Laser Doppler Anemometry), and/or,
2) Illuminating an object by the light source and diverting light from the illuminated object onto light sensors by the repetitive optical structure.

The light source illuminates the object whereby a speckle pattern is formed on the object. The speckle pattern moves with movement of the object, and speckle pattern movement is determined without a need for imaging the object onto the repetitive optical structure, i.e. the optical member.

Since the speckle pattern is not imaged onto the optical member, the distance and possible distance changes between the object and the optical member substantially do not affect system performance.

In an embodiment of the invention well suited for Laser Doppler Anemometry applications, a collimated light source is provided for illuminating the optical member, and an imaging system is provided for imaging the optical member onto a measurement volume thereby forming a fringe pattern in the measurement volume.

In another embodiment of the invention light emanating from the object are received at an input plane. The optical member directs light emanating from different parts of the input plane in substantially the same direction by corresponding elements of the optical member.

In yet another embodiment of the invention, the above-mentioned embodiments are combined, i.e. the optical member is utilized both for transmission of coherent light towards the object and for reception of light emanating from the object.

Dividing the light beam from the light source into a plurality of light beams by illumination of the optical member increases safety, since the power of an individual light beam that accidentally may enter a human eye is lowered.

Further the signal to noise ratio is increased, since the projection of a fringe-like pattern onto the object will make the speckle spectrum correspond to the optimum for the optical member.

The individual optical elements may interact with light by reflection, refraction, scattering, diffraction, etc, either alone or in any combination, of light incident upon them. Thus, the individual optical elements may be lenses, such as cylindrical lenses, spherical lenses, Fresnel lenses, ball lenses, etc, prisms, prism stubs, mirrors, liquid crystals, etc.

Alternatively, the optical member may be formed by a diffractive optical element, such as holographically produced lenses, etc.

Further, the optical member may comprise a linear phase grating with a sinusoidal modulation of the film thickness, e.g. in a photo resist film.

After interaction with the individual optical elements, the light may be transmitted through the elements or be reflected from the elements, e.g. appropriately coated for reflection. The system also comprises a detector with at least one optical detector element for conversion of light incident upon it into a corresponding electronic signal.

The detector is positioned in the propagation path of the light emanating from the optical member.

The invention is most easily understood considering an embodiment wherein the optical member is a repetitive optical member constituted by a linear array of cylindrical lenses. The focal length of the lenses may be positive or negative. For simplicity only positive lenses are depicted in the appended figures. The input plane is located in front of the array of lenses at a distance equal to the focal length of the lenses and perpendicular to the direction of propagation of the incoming light emanating from the object.

The object has a surface of a size that allows formation of a speckle pattern. Surface roughness of the object causes formation of the speckle pattern since surface deviations modify the phase of various parts of the incident light differently. Preferably, at least a part of the surface is illuminated by a laser, and a speckle pattern could be detected at the input plane, e.g. by intensity measurements, caused by variations of the electromagnetic field along the input plane. In the following, such electromagnetic intensity variations are termed "speckle variations". When the object is displaced, the speckle variations move along the input plane with a velocity proportional to the surface velocity or the rotational speed. The individual optical elements direct the light towards an optical detector of the embodiment. When a speckle variation at the input plane has moved a distance that is equal to the width of an individual optical element, the corresponding light emanating from the individual optical element sweep across the area of the optical detector. This is repeated for the next optical element, and it is seen that when a speckle variation has traversed a distance equal to the length of the linear array, the optical detector is swept repetitively a number of times equal to the number of individual optical elements of the linear array. It is seen that for a regular speckle variation pattern at the input plane with a speckle size that is substantially equal to the size of an individual optical element, the intensity of the electromagnetic field at a detector element varies between a high intensity when light areas of the speckle variations are aligned with the optical elements and a low intensity when dark areas of the speckle variations are aligned with the optical elements, and that the frequency of the oscillations corresponds to the velocity of displacement of the speckle variations in the direction of the longitudinal extension of the linear array divided by the array pitch, i.e. the distance between individual neighboring optical elements.

This principle of operation applies in general to other embodiments of the present invention regardless of the type of optical member utilized and regardless of whether or not an image of the object is formed at the input plane. For example, a point source positioned substantially at the input plane and emitting a diverging beam of light may illuminate the object. The radiation is diffusely reflected by the object and received at the input plane. It is well known in the art that speckle variation displacements at the input plane is twice the corresponding displacements at the surface of the object regardless of the distance between the object and the input plane.

Alternatively, the object may be illuminated by a collimated beam of light in which case, the displacement of speckle variations at the input plane is equal to corresponding displacements at the surface of the object independent of the distance between the object and the input plane.

In still another embodiment of the present invention, a Fourier transforming lens is positioned between the object and the input plane in such a way that the input plane is positioned at the Fourier plane of the Fourier transforming lens, i.e. at the back focal plane of the lens, whereby rotational displacement of the object can be determined independent of the distance between the object and the input plane. Furthermore, the detected frequency will be independent of the radius of curvature of the rotating object and independent of the wavelength. Besides, a transverse displacement of the object will only give rise to speckle de-correlation and not give rise to speckle displacement.

The optical member provides a spatial filtering of the electromagnetic field at the input plane in such a way that moving speckle variations of a size comparable to the size of the individual optical elements leads to an oscillating detector signal. Speed of movement can e.g. be measured by zero-crossing detection of this signal.

It is seen that two-dimensional speckle displacement may be determined with an embodiment of the present invention having a two-dimensional array of optical elements.

In a preferred embodiment of the present invention, the system further comprises an imaging system for imaging part of the input plane onto the at least one detector element whereby each of the individual optical elements in combination with the imaging system images specific parts of the input plane onto the same specific area of an output plane so that points at the input plane that are positioned at the same relative positions in relation to adjacent respective optical elements are imaged onto the same point at the optical detector. As further explained below, without the imaging system, there is a small distance between imaged points at the detector for corresponding points at the input plane having the same relative position in relation to respective optical elements. However, the accuracy of the system may still be sufficient and will depend on the actual size of the system.

The optical member and the above-mentioned imaging system may be merged into a single physical component, such as a molded plastic component, in order to obtain a further compact system suited for mass production.

The displacement sensor with the optical member facilitates determination of speckle variation movement at the input plane in a direction of the optical member. An optical system positioned between the object and the input plane determines the type of object movement that is determined by converting the speckle variations arising from the specified object movement into a linear speckle translation in the system input plane. The object movement could be in-plane or out-of-plane rotation and/or displacement, such as one- or two-dimensional displacement, one- or two-dimensional velocity, angular displacement, angular velocity, etc.

The number, size, and position of the detector elements together with the processing of the signals obtained from the elements, such as subtraction, addition, etc, determine the suppression of harmonics in the output signal. Specifically, the direction of movement of speckle variations can be probed in case a quadrature (or close to quadrature) signal is obtained.

It is an important advantage of the present invention that the displacement sensor only comprises a few optical detector elements, such as one, two, four, six or seven, etc, elements.

Occurrence of velocity signal drop out may be reduced by provision of a second set of optical detector elements that is displaced in relation to the existing set of detector elements so that a signal that is statistically independent of the other signal may be available from one set of detector elements during absence of a signal from the other set of detector elements. Thus by proper processing of the two signals, e.g. switching to a set of detector elements generating a velocity signal, occurrence of signal drop out is minimized.

BRIEF DESCRIPTION OF THE DRAWINGS

For a better understanding of the present invention reference will now be made, by way of example, to the accompanying drawings, in which.

DESCRIPTION OF PREFERRED EMBODIMENTS

Figure 1:
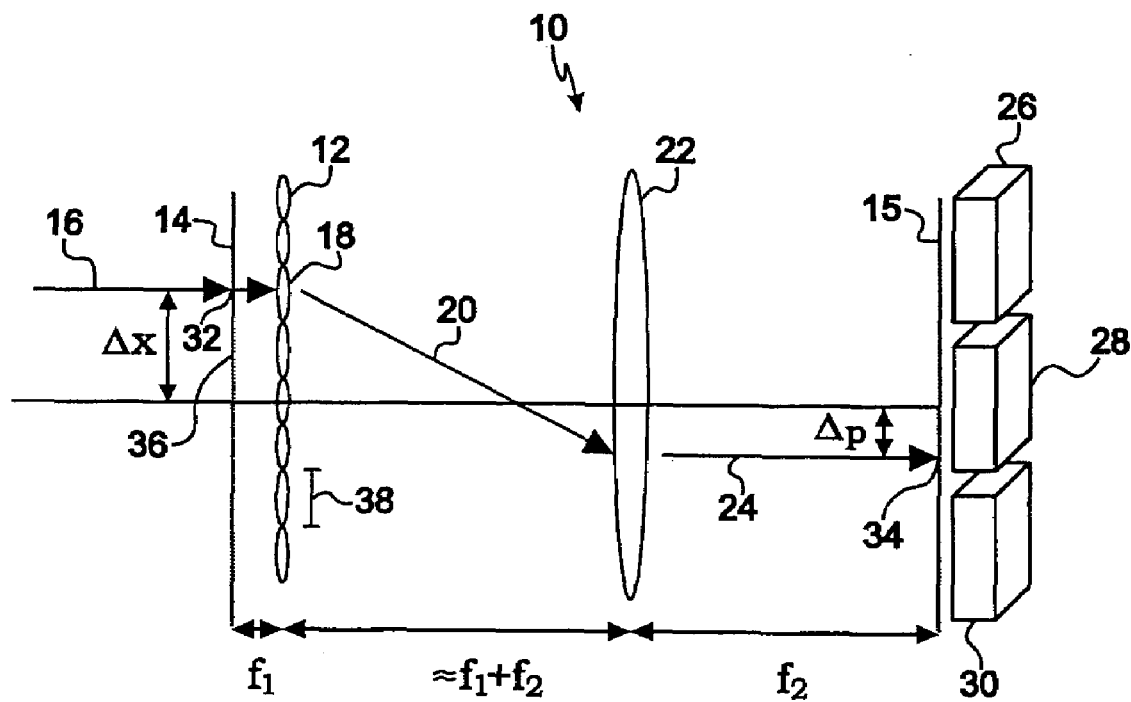
FIG. 1 schematically illustrates a preferred embodiment of a displacement sensor according to the present invention.

FIG. 1 schematically shows a displacement sensor 10 according to the present invention with a linear array 12 of cylindrical lenses 18. $f_1$ is the focal length of the cylindrical lenses 18. The input plane 14 is located at a distance equal to the focal length $f_1$ of the lenses 18 and perpendicular to the direction 16 of propagation of the incoming light emanating from the object (not shown). In this embodiment 10, a part of the surface of the object (not shown) scatters light onto the input plane 14. Preferably, a laser illuminates the part of the surface, and a speckle variation is generated at the input plane. When the object is displaced, the speckle variations move correspondingly along the input plane 14. The individual cylindrical lenses 18 direct the light 16, 20 towards a refractive lens 22 having a focal length $f_2$ and being positioned a distance equal to $f_1+f_2$ from the linear array 12. The lens 22 further refracts the light 20 into waves 24 propagating towards optical detector elements 26, 28, and 30 positioned at the focal plane of lens 22. In this way, the input plane 14 is repeatedly imaged onto an output plane 15. The detector elements 26, 28, 30 are positioned so that their individual surfaces for reception of light coincide with the output plane 15. It is seen that an area 32 of the input plane is imaged onto an area 34 of a detector element 28 and that corresponding areas 36 that are located at the same relative positions in relation to adjacent respective cylindrical lenses 18 are imaged onto the same area 34 of the optical detector constituted by the detector elements 26, 28, 30.

It should be noted that the distance between the linear array 12 and the lens 22 is chosen to be equal to $f_1+f_2$ in the present example for ease of explanation of the operation of the displacement sensor 10. However, the displacement sensor 10 operates with any distance between the linear array 12 and the lens 22. For compactness it may be preferred to set the distance to zero.

Figure 28:
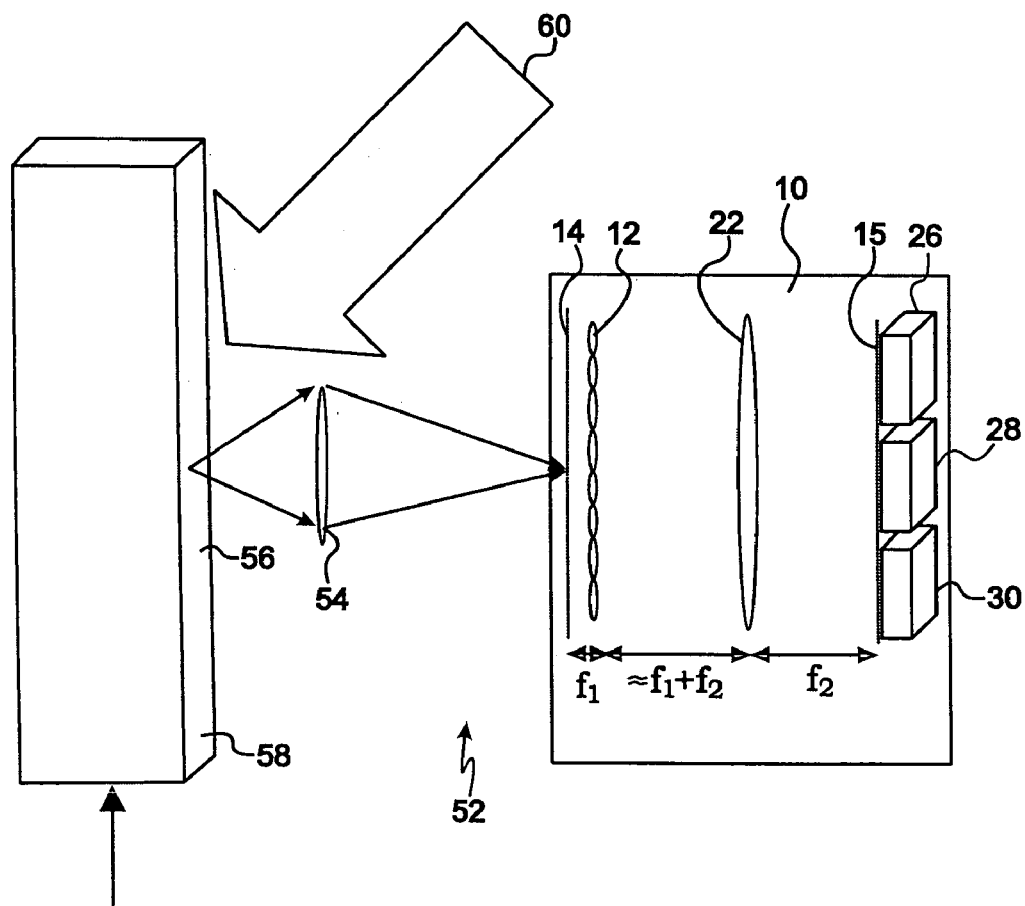

It should also be noted that in an imaging system as the one shown in FIG. 28, a rotational displacement of the object does not lead to translation of speckle variations in the input plane. However, rotational displacement of the object will typically lead to speckle boiling.

Figure 2:
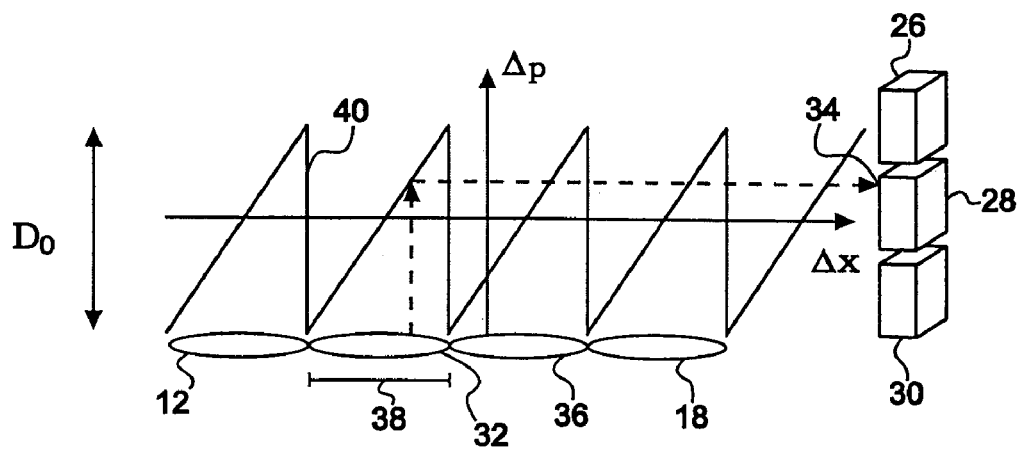
FIG. 2 illustrates the operating principle of the displacement sensor of FIG. 1, FIG. 3 schematically illustrates another preferred embodiment of a displacement sensor according to the present invention.

The operating principle of the displacement sensor of FIG. 1 is further illustrated in FIG. 2. When a speckle variation 16 at the input plane 14 has moved a distance 38 that is equal to the width $\Lambda_0$, i.e. the pitch, of an individual optical element 18, the corresponding image formed by the combination of lens 22 and the respective cylindrical lens 18 sweeps across the area 40 of the optical detector elements 26, 28, and 30. This is repeated for the other optical elements 18, and it is seen that when a speckle variation has traversed a distance equal to the length of the linear array 12, the optical detector 26, 28, 30 is swept repetitively a number of times equal to the number of individual optical elements 18 of the linear array 12. It is seen that for a regular speckle variation pattern at the input plane with an average speckle size that is comparable with the size 38 of an individual optical element 18, the intensity of the electromagnetic field at a detector element 26, 28, 30 varies between a high intensity when bright areas of the speckle variations are aligned with the sensor elements 26, 28, 30 and a low intensity when dark areas of the speckle variations are aligned with the optical elements 26, 28, 30, and that the frequency of the oscillations corresponds to the velocity of displacement of the speckle variations in the direction $\Delta x$ of the longitudinal extension of the linear array 12 divided by the array pitch, i.e. the distance between individual neighboring optical elements.

As previously mentioned, the same principle of operation applies in general to other embodiments of the present invention regardless of the type of optical member utilized and regardless of whether or not an image of the object is formed at the input plane 14.

With reference again to FIGS. 1 and 2 wherein $\Lambda_0$ denotes the pitch 38 of the optical member 12 and $f_1$ is the focal length of the individual optical elements 18 of the optical member 12 and $f_2$ is the focal length of the lens 22, the distance $D_0$ in the detector plane 26 and 30, repetitively swept by a speckle traversing the input plane is given by $$D_0 = \Lambda_0 \frac{f_2}{f_1}.$$

In the detected electrical signal $D_0$ corresponds to the period of the signal, i.e. a 360° phase shift. This equation is valid for any distance between the optical member 12 and the lens 22.

For the aperture of the system D, e.g. in FIG. 1 D is equal to the diameter of the lens 22, the following equation should preferably be fulfilled:

$$\frac{D}{f_2} \geq \frac{\Lambda_0}{f_1}.$$

Figure 3:
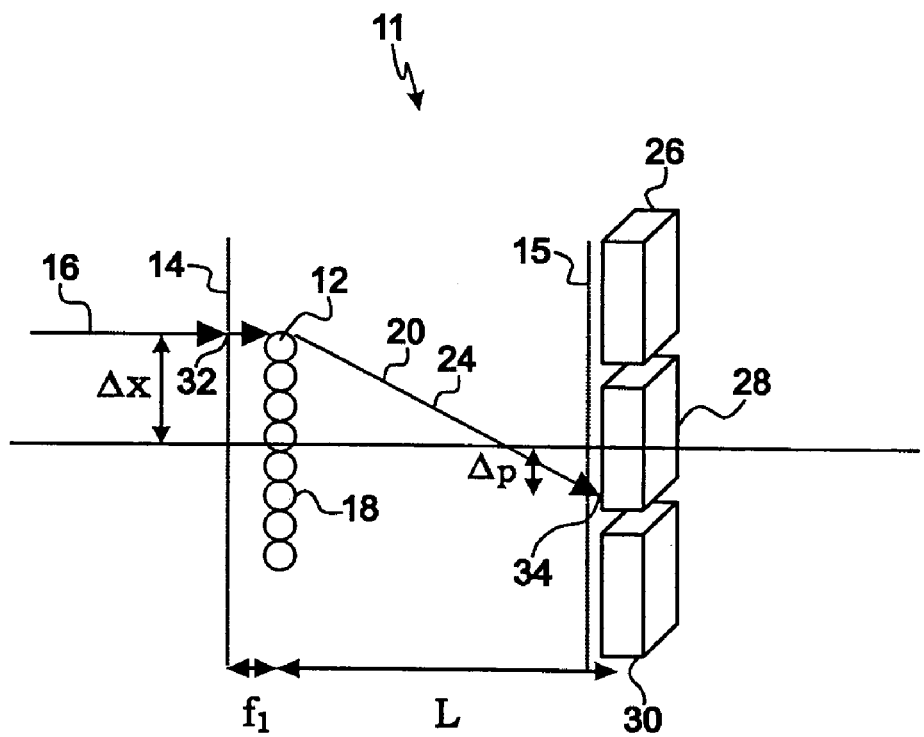
Figure 4:
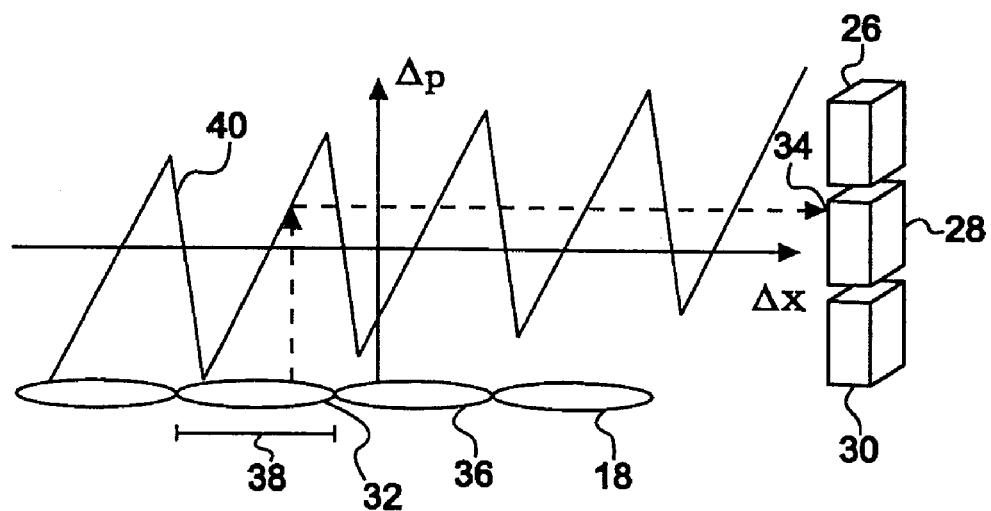
FIG. 4 illustrates the operating principle of the displacement sensor of FIG. 3, FIG. 5 schematically illustrates electromagnetic wave propagation in the displacement sensor of FIG. 1, FIG. 6 schematically illustrates a displacement sensor with a Fresnel lens array, FIG. 7 schematically illustrates a displacement sensor with a linear phase grating having a sinusoidal modulation in the film thickness, FIG. 8 schematically illustrates a displacement sensor with a prism array.

Further, it is preferred that the effect of the individual optical elements is governed by the lens effect and not by diffraction, i.e.:

$$\frac{f_1}{k\Lambda_0^2} \ll 1.$$

Where k is the optical wavenumber. FIG. 3 schematically shows another displacement sensor 11 according to the present invention without the lens 22, i.e. without an imaging system that images the input plane 14 onto the output plane 15. In this embodiment, the receiving areas of the detector elements 26, 28, 30 define the output plane 15. As more clearly illustrated in FIG. 4, without the imaging system, there is a small distance between imaged points 34 at the detector 26, 28, 30 for corresponding points 32 at the input plane 14 having the same relative position in relation to respective optical elements 18. However, the accuracy of the system 11 may still be sufficient and will depend on the actual size of the system 11.

Figure 5:
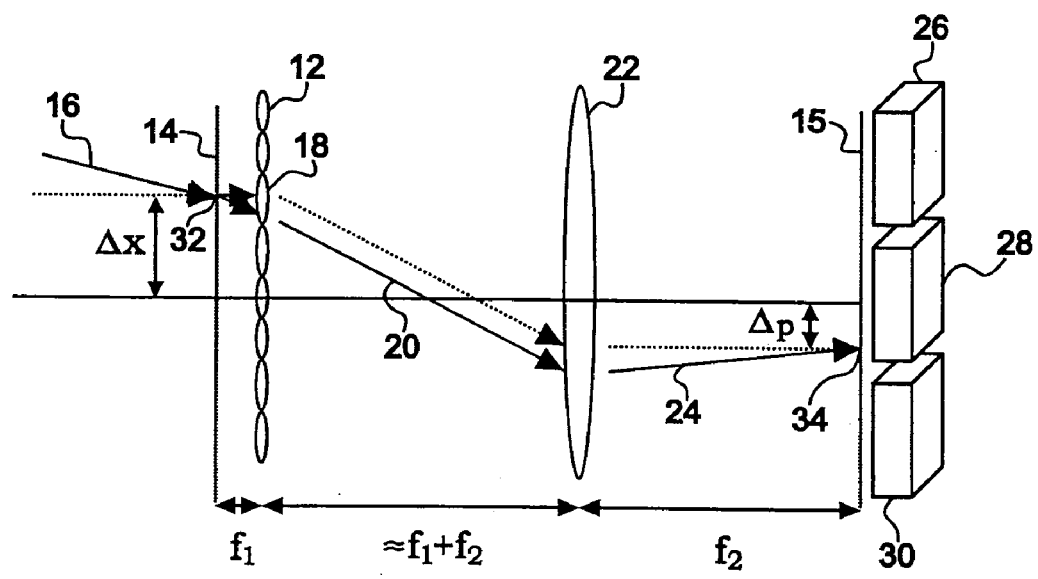

In FIG. 5, the image forming of the displacement sensor shown in FIG. 1 is further illustrated, and it is seen that the position of the intersection 34 between the optical detector element 28 and incident light 24 is independent of the slope of the electromagnetic wave 16 incident on the input plane 14. It only depends on the relative position of the intersection 32 between the input plane 14 and the input wave 16 in relation to the adjacent optical element 18.

Figure 6:
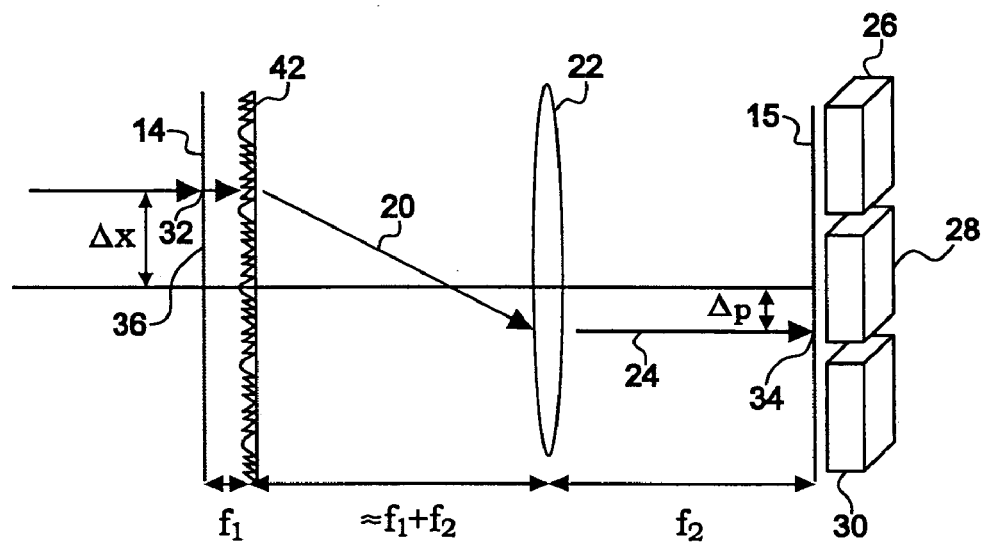

FIG. 6 schematically illustrates a displacement sensor similar to the sensor shown in FIG. 1, wherein the linear array of cylindrical lenses has been substituted with a Fresnel lens array 42. The linear array of cylindrical lenses may alternatively be substituted by a diffractive optical element 42.

Figure 7:
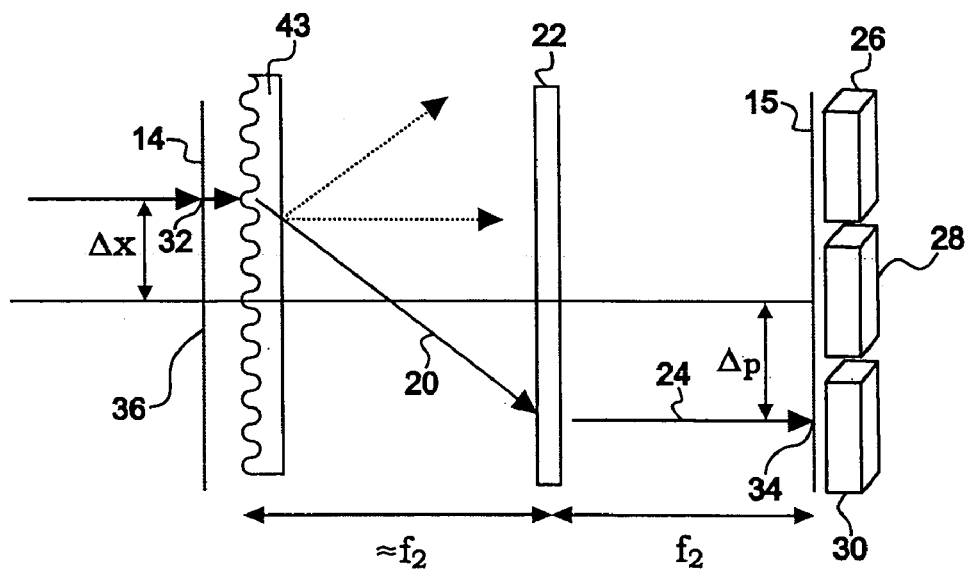

Likewise FIG. 7 schematically illustrates a displacement sensor similar to the sensor shown in FIG. 1, wherein the linear array of cylindrical lenses has been substituted with a linear phase grating 43 with a sinusoidal modulation of the film thickness, e.g. in a photo resist film. The phase grating can be made by exposing a (thick) photo resist plate with an interference pattern made by crossing two laser beams. Incident light will primarily be diffracted in the "plus first" and "minus fist" order. Besides, non-diffracted light will pass directly through the phase grating.

Figure 8:
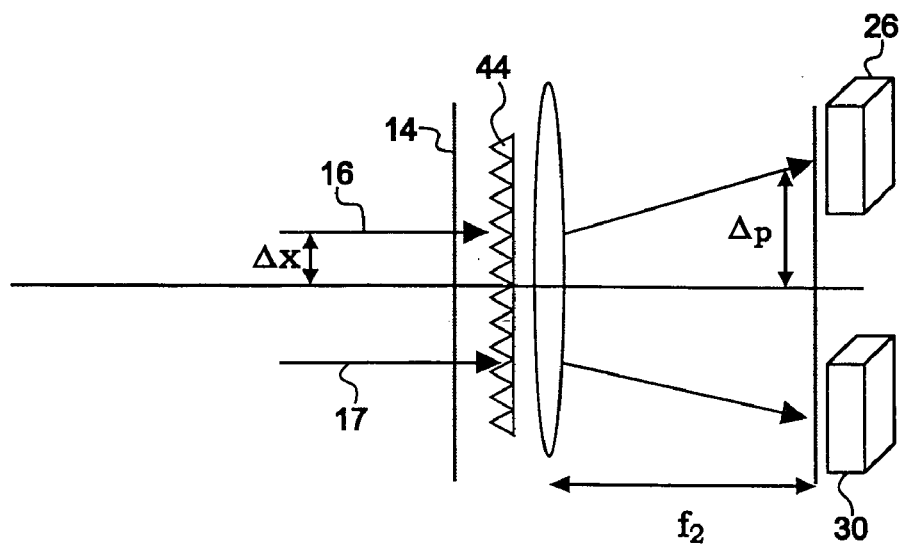

In FIG. 8, an alternative embodiment of the displacement sensor shown in FIG. 3 is illustrated, wherein the linear array of cylindrical lenses has been substituted by a linear array 44 of prisms. The two sides of each prism refract incoming rays of light towards two respective detector elements 26, 30.

Figure 9:
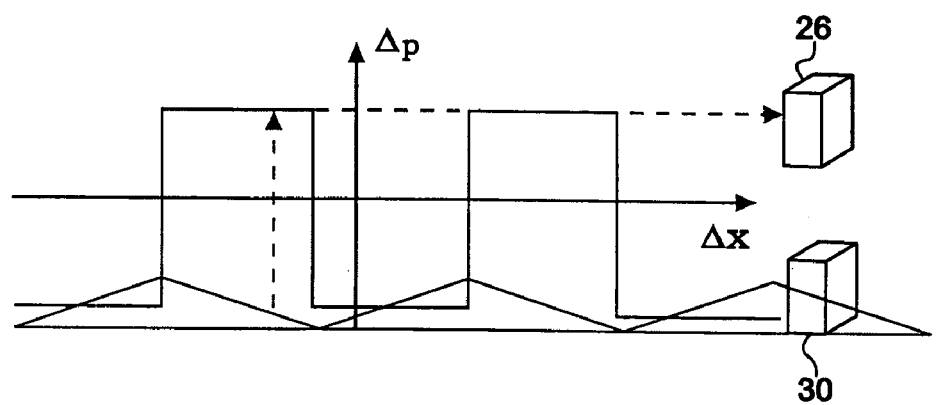
FIG. 9 illustrates the operating principle of the displacement sensor of FIG. 8, FIG. 10 schematically illustrates a displacement sensor with an array of prism stubs.

The operating principle of the displacement sensor of FIG. 8 is more clearly illustrated in FIG. 9 showing that a speckle variation is alternatingly directed toward the two respective detector elements 26, 30 when the speckle variation traverses the linear prism array 44 along its longitudinal extension.

Figure 10:
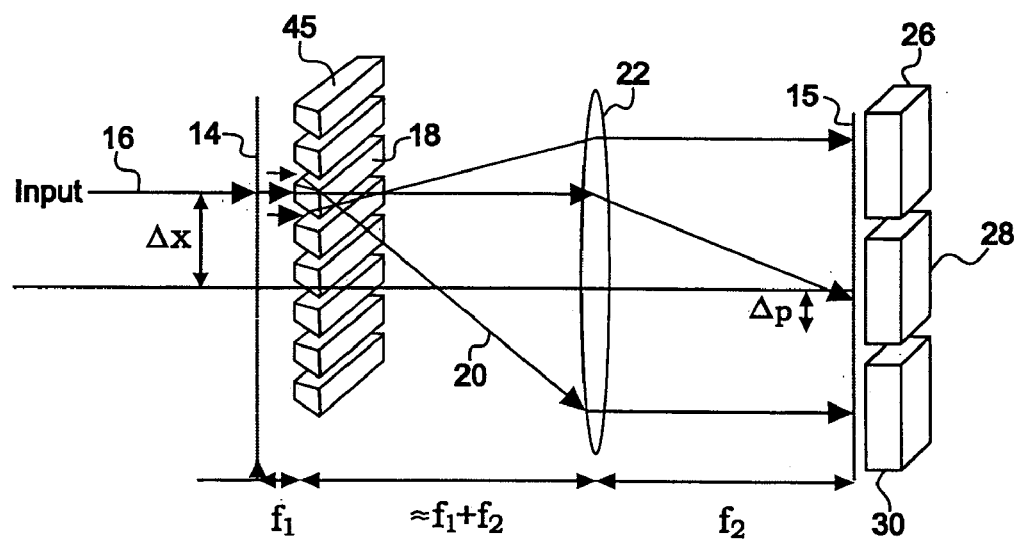

In FIG. 10, a similar embodiment of the displacement sensor is illustrated, wherein the linear array of cylindrical lenses has been substituted by a linear array 45 of prism stubs. As before, the two sides of each prism refract incoming rays of light towards two respective detector elements 26, 30 while the top surface transmits or refracts incoming rays toward a third detector element 28.

Figure 11:
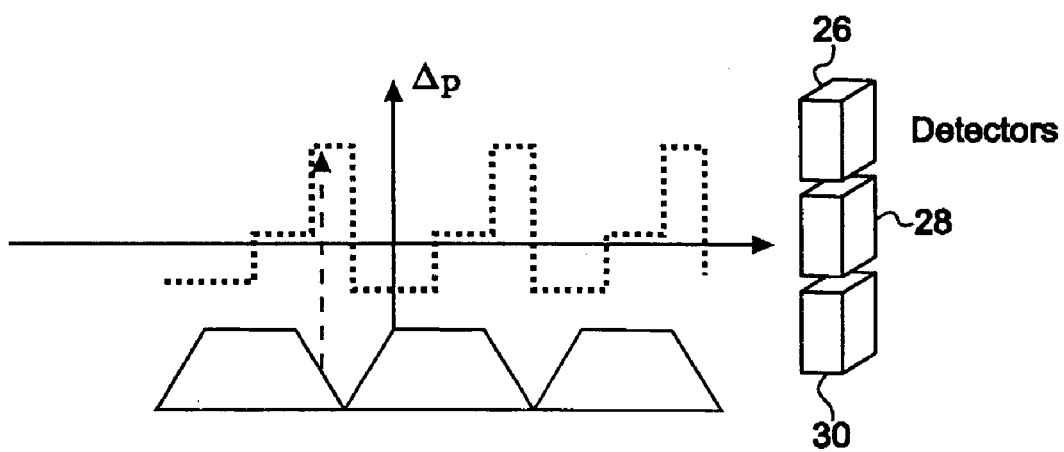
FIG. 11 illustrates the operating principle of the displacement sensor of FIG. 10.

The operating principle of the displacement sensor of FIG. 10 is more clearly illustrated in FIG. 11 showing that a speckle variation is alternatingly directed toward the three respective detector elements 26, 28, 30 when the speckle variation traverses the linear prism stub array 44 along its longitudinal extension.

It should be noted that the direction of propagation of waves refracted by the prisms depends on the slope of the direction of propagation of the incoming light. It should also be noted that the phase difference between detector signals is fixed. It is an important advantage of these embodiments of the invention that the phase difference is determined by the geometry of the optical member and independent on the detector element positions. It is another advantage that utilization of prisms facilitates utilization of small detectors.

Figure 12:
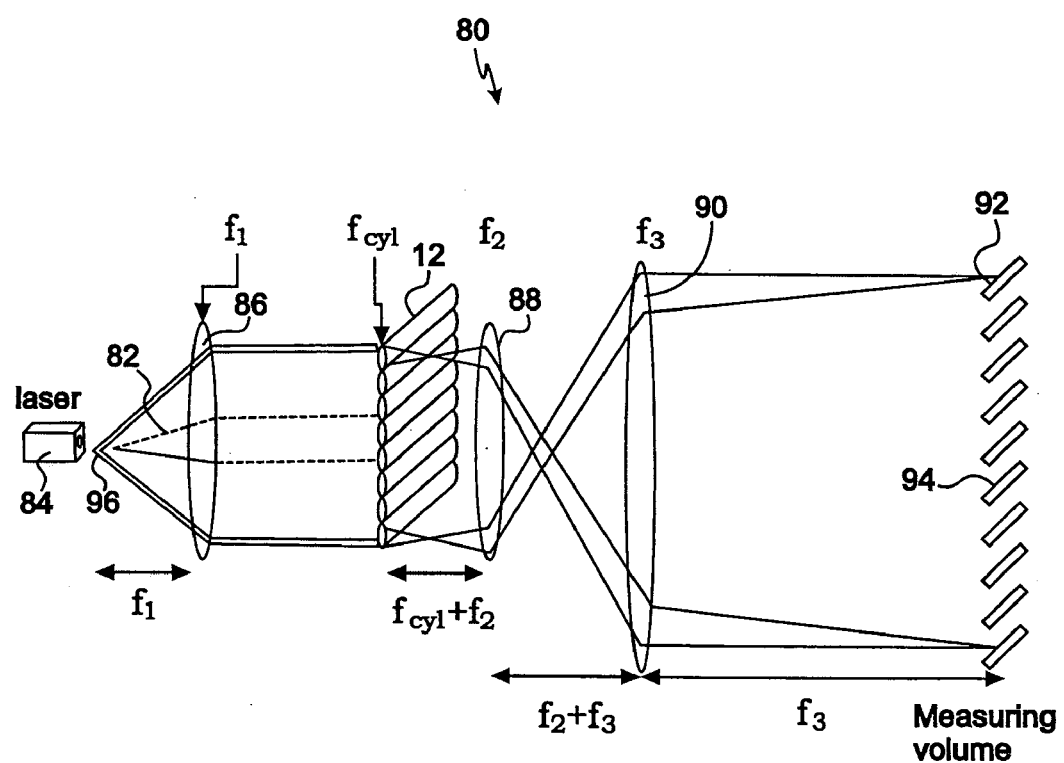
FIG. 12 illustrates an embodiment operating like a Laser Doppler Anemometer.

FIG. 12 illustrates an embodiment 80 of the invention that operates like a Laser Doppler Anemometer. Light 82 emitted from a point source laser 84 is collimated by lens 86 and the collimated light illuminates an array 12 of cylindrical lenses. Lenses 88 and 90 form a telescope that images the focal spots of the cylindrical lenses 12 in the measuring volume 92 whereby a set of straight and equidistant fringe planes 94 are formed in the measurement volume 92. It is seen that the first areas occupied by the fringes 94 are mapped into the same second area 96 at the laser source 84.

Figure 13:
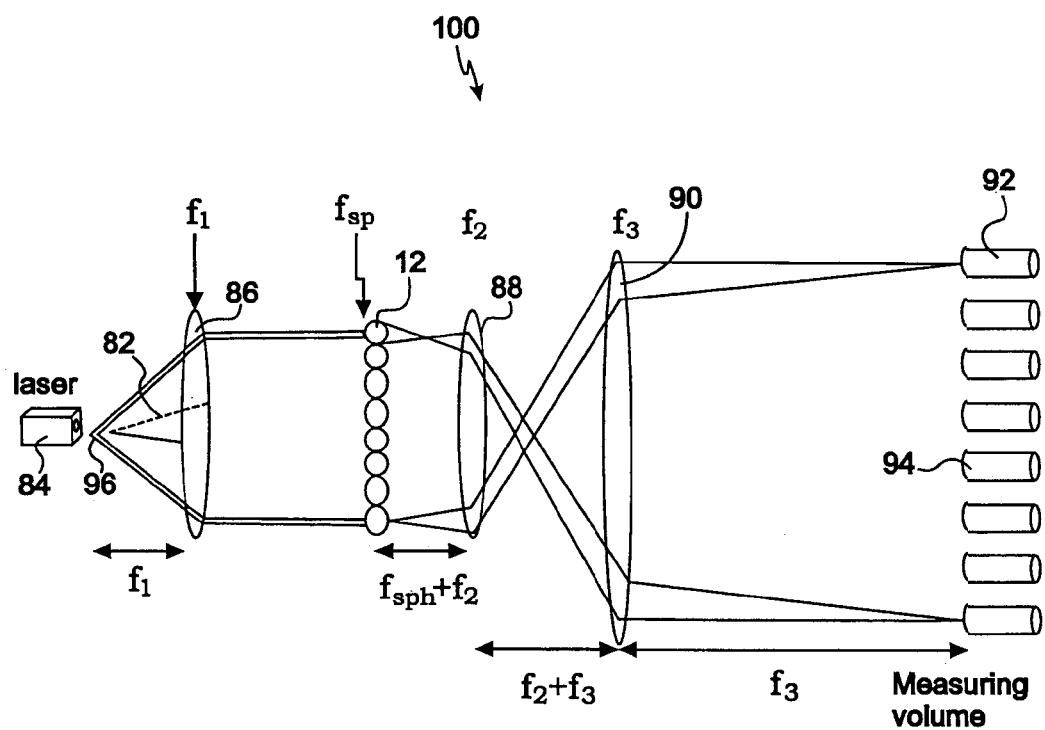
FIG. 13 illustrates another embodiment operating like a Laser Doppler Anemometer.

FIG. 13 illustrates another embodiment 100 of the invention that is similar to the embodiment 80 shown in FIG. 12, however, in this embodiment an array 12 of spherical lenses has substituted the array of cylinder lenses in FIG. 12. This leads to equidistant and straight cylindrical focal lines 94.

Particles or a solid surface passing the fringes created in the measuring volume will scatter light. A detector place at an arbitrary position will give rise to a modulated signal, the frequency of which is given by the velocity component perpendicular to the fringes divided by the fringe distance.

Figure 14:
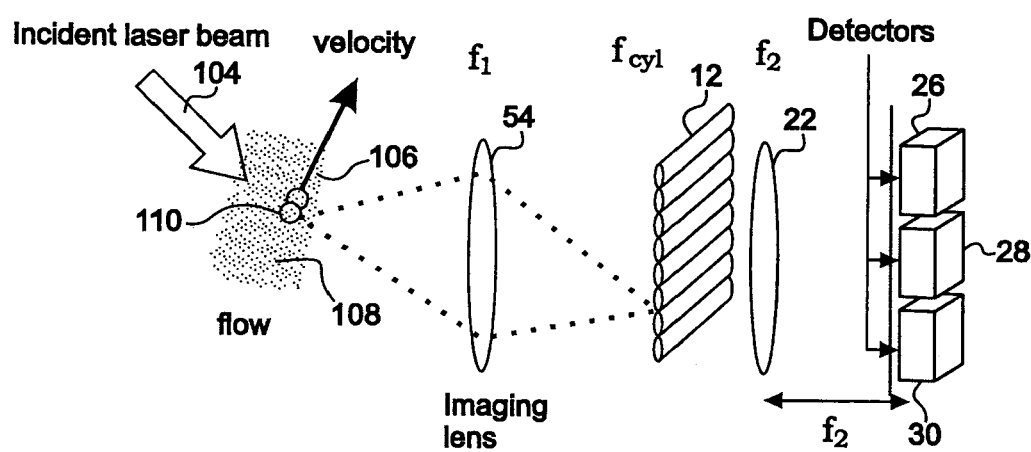
FIG. 14 illustrates an embodiment suited for determination of the velocity of a particle, where direction for particle velocity can be determined.
Figure 15:
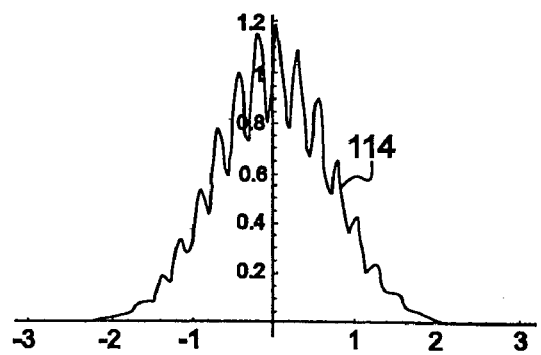
FIG. 15 is a plot of a detector element signal from an embodiment shown in FIG. 12 or 13.
Figure 16:
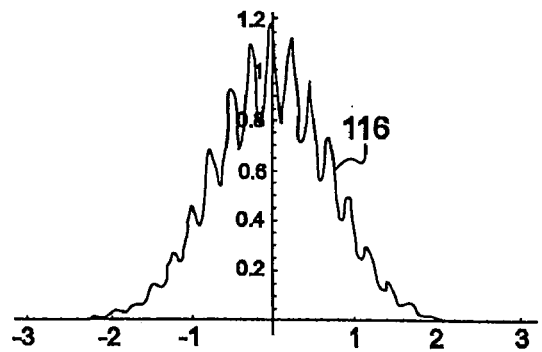
FIG. 16 is a plot of a signal from a displaced optical detector element having a phase lag in relation to the signal shown in FIG. 14.

FIG. 14 illustrates the embodiment 102 also shown in FIG. 1 for measurement of particle velocity 106. A laser beam 104 is focused onto a measurement volume 108 that is imaged onto the input plane 15 of the system with lens $f_1$. When a particle 110 traverses the measurement volume 108, its image 112 will traverse the array 12 of cylindrical lenses, and each of the detectors 26, 28, 30 receives an oscillating optical signal similar to the signal created by fringes in a Laser Doppler Anemometer. Thus, each detector element 26, 28, 30 receives light from the particle 110 as if the particle 110 traverses a set of fringes, in the following denoted virtual fringes. FIG. 15 is a plot of the output signal 114 from one of the detector elements generated in response to the oscillating optical signal. A corresponding signal 116 from an adjacent detector element is shown in FIG. 16. This signal 116 is phase shifted in relation to the signal 114 shown in FIG. 15 because of the physical displacement of the detector elements.

Figure 17:
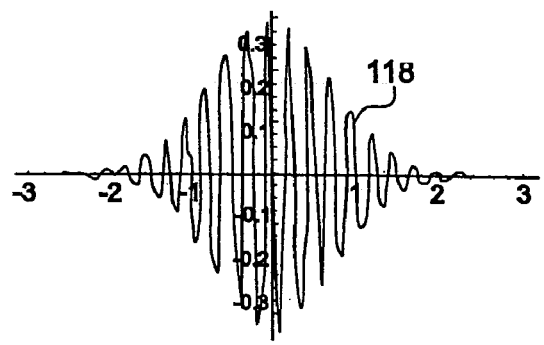
FIG. 17 is a plot of the difference between the signals shown in FIGS. 14 and 15.

Since the low frequency pedestals of the two signals are substantially identical, the difference between the two signals 114, 116 is an AC-signal 118 as shown in FIG. 17. It is preferred that the phase shift between the two detector elements 26, 28; 28, 30 is substantially equal to 90° so that the direction of the particle velocity can be deduced whereby the requirement of a costly Bragg-cell is eliminated. The angle of the incident laser beam is not critical. A forward scattering system provides the largest signals, however, a back scattering system may be preferred for other reasons.

In this embodiment 102 of the invention, it is seen that first areas of the measurement volume 108, i.e. corresponding to the virtual fringes, are mapped into the same second area at a detector element.

Figure 18:
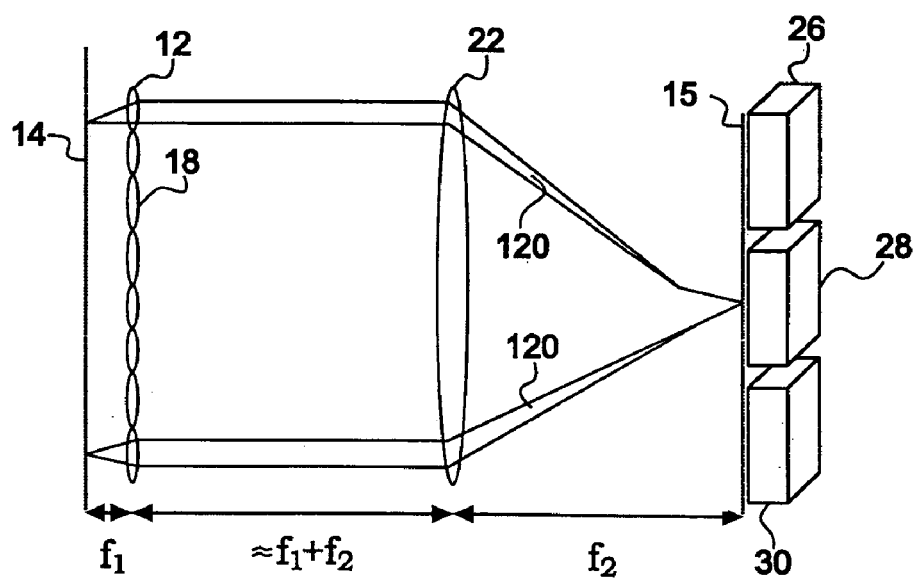
FIG. 18 illustrates the definition of the input plane for an embodiment of the invention.

FIG. 18 illustrates the definition of the input plane 14 of the system. In the embodiment 10 shown in FIG. 1, the output plane 15, defined by the detector element 26, 28, 30 surfaces, is imaged onto the input plane 14 by the combination of the lens array 12 and the lens 22. Thus, rays 120 emitted from the output plane 15 would be focused onto the input plane 14 by an element 18 of the optical member 12.

Figure 19:
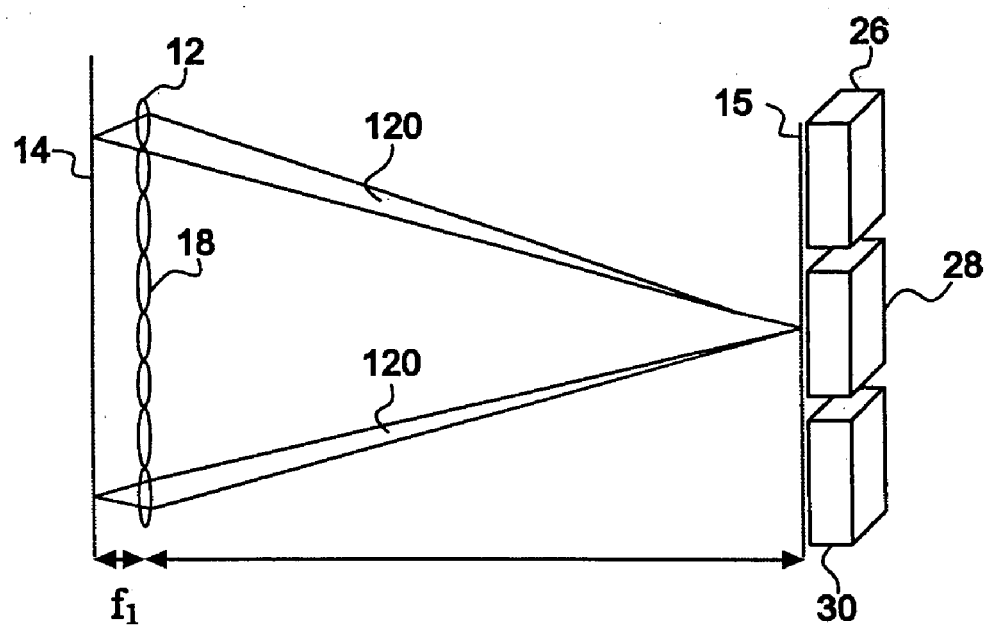
FIG. 19 illustrates the definition of the input plane for another embodiment of the invention.

FIG. 19 illustrates the definition of the input plane 14 for the embodiment 11 shown in FIG. 3. There is no imaging system in this embodiment 11, however still, rays 120 emitted from the output plane 15 would be focused onto the input plane 14 by an element 18 of the optical member.

Figure 20:
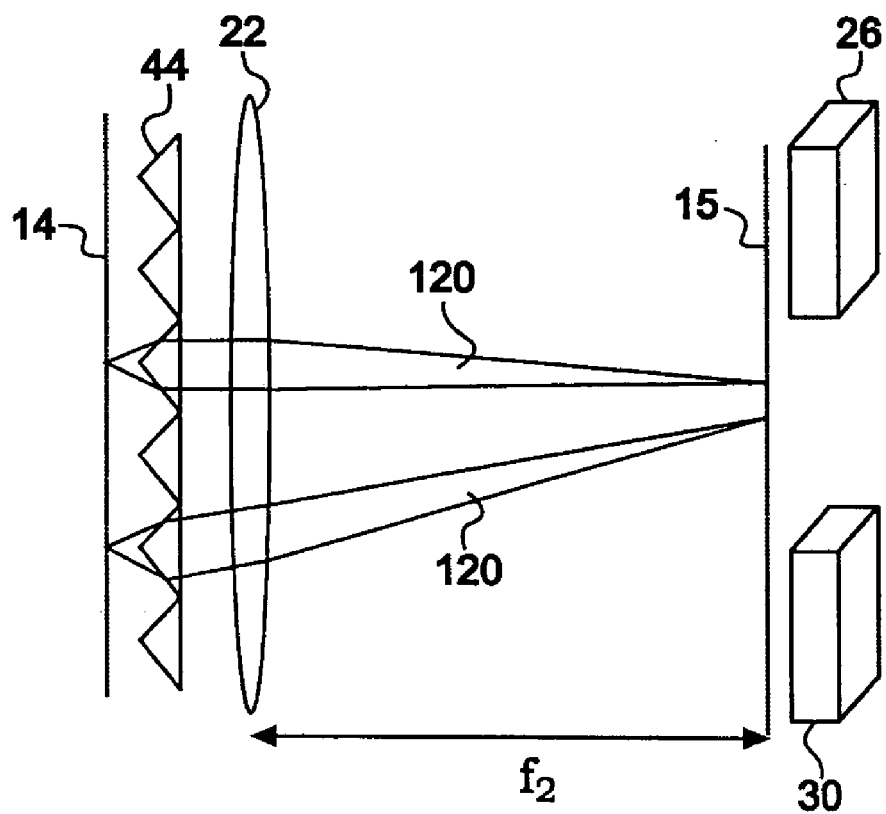
FIG. 20 illustrates the definition of the input plane for yet another embodiment of the invention.

FIG. 20 illustrates the definition of the input plane for the embodiment shown in FIG. 8. Also in this embodiment, there is no imaging system, however still, rays 120 emitted from the output plane 15 would be focused onto the input plane 14 by an element of the optical member 44.

Figure 21:
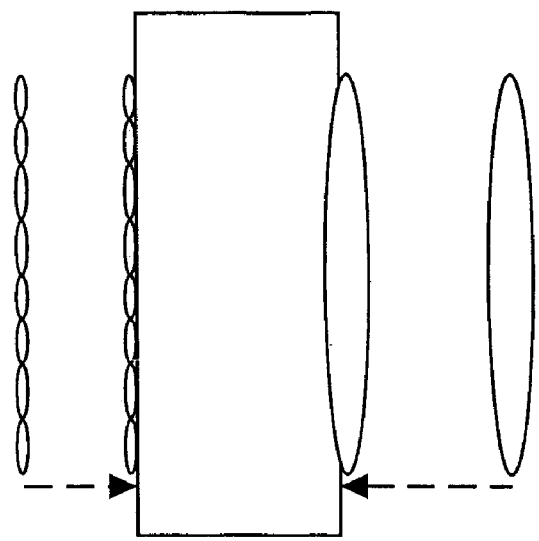
FIG. 21 illustrates combining of optical components of a displacement sensor according to the present invention.
Figure 22:
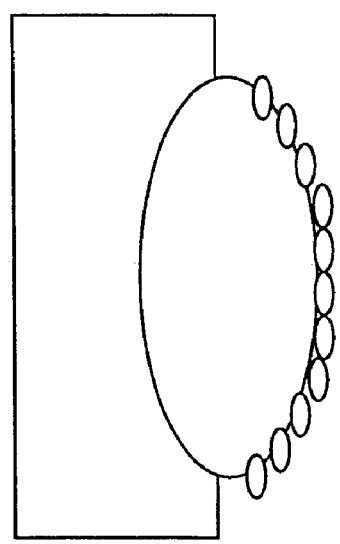
FIG. 22 illustrates another way of combining of optical components of a displacement sensor according to the present invention.
Figure 23:
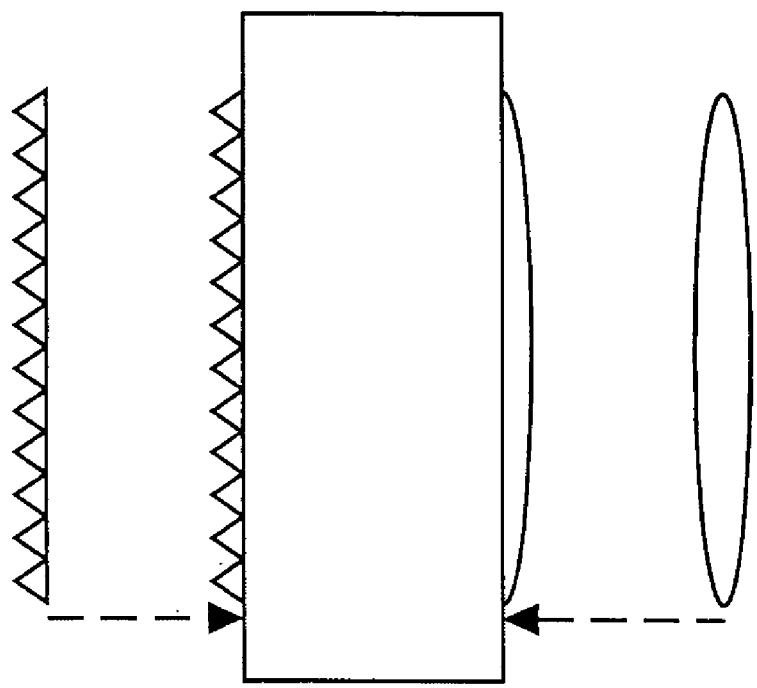
FIG. 23 illustrates combining of optical components of a displacement sensor with a prism array according to the present invention, FIG. 24 schematically illustrates a displacement sensor according to the present invention with optical components combined with a prism, FIG. 25 schematically illustrates another displacement sensor according to the present invention with optical components combined with a prism, FIG. 26 schematically illustrates a two-dimensional array of prism stubs.

FIGS. 21–23 illustrates various ways of combining the optical components of the previously illustrated displacement sensors in order to provide a further compact system suited for mass production.

Figure 24:
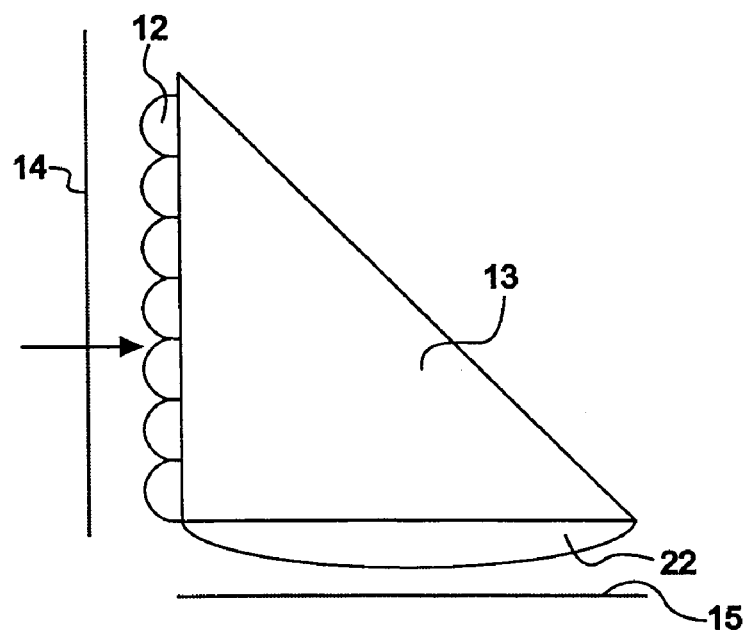
Figure 25:
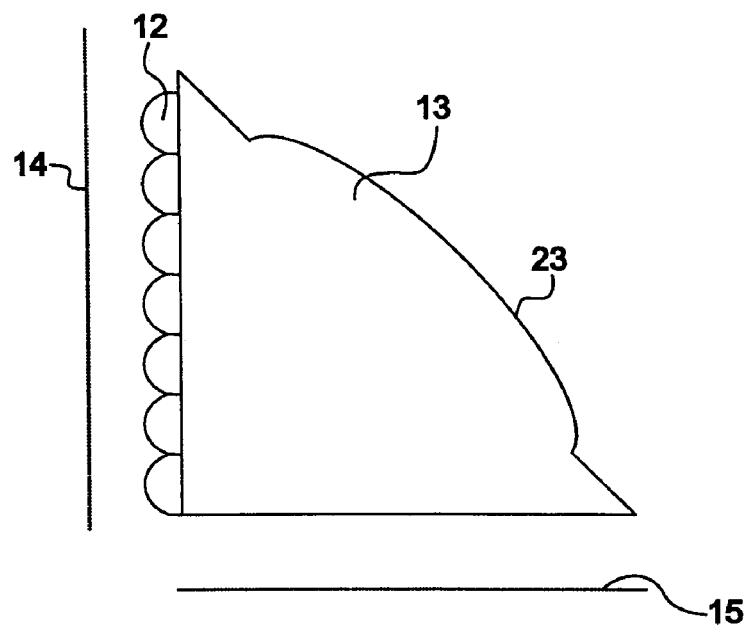

In FIGS. 24 and 25, the optical components have been combined with a prism to limit the linear extension of the system. In FIG. 25, the lens 22 shown in FIG. 13 has been substituted by a concave mirror 23.

Figure 26:
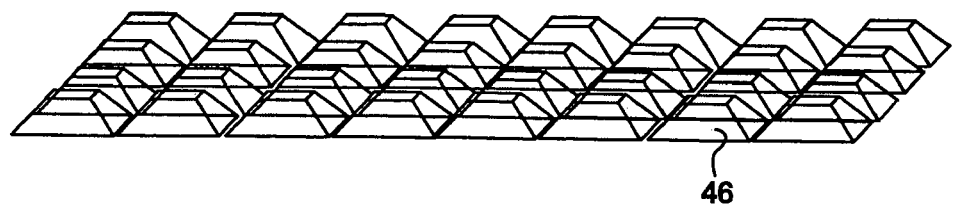
Figure 27:
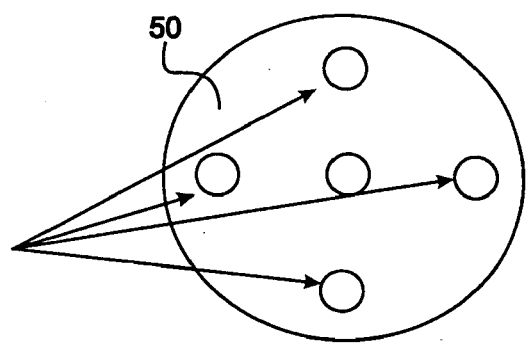
FIG. 27 illustrates electromagnetic wave propagation of waves to the detector plane having been refracted by a prism stub, FIG. 28 schematically illustrates the operation of a linear displacement sensor system according to the present invention, FIG. 29 schematically illustrates the operation of another linear displacement sensor system according to the present invention, FIG. 30 schematically illustrates the operation of a displacement sensor system for determination of rotational displacement according to the present invention, FIG. 31 schematically illustrates a reflection configuration of the present invention for determination of linear displacement, FIG. 32 schematically illustrates a reflection configuration of the present invention for determination of rotational displacement, FIG. 33 schematically illustrates a reflection configuration of the present invention for determination of 2D rotational displacement, FIG. 34 schematically illustrates a reflection configuration of the present invention for determination of 2D linear displacement, FIG. 35 schematically illustrates an embodiment with three lenticular arrays, FIG. 36 schematically illustrates an embodiment with four lenticular arrays, FIG. 37 schematically illustrates a simple detector configuration.

FIG. 26 schematically illustrates a repetitive optical member in the form of a two-dimensional array 46 of prism stubs for determination of speckle displacement in two dimensions. FIG. 27 illustrates electromagnetic wave propagation of waves 50 having been refracted by a prism stub. It is seen that a flat top prism refracts incoming beams of light into five directions towards five different respective detector elements. The phase difference between detector element output signals depends solely on the geometry of the flat top prism array. It does not depend on detector element position. A prism array 44, 46, 48 facilitates the use of small detector elements.

FIG. 28 schematically illustrates a displacement sensor system 52 according to the present invention, comprising an imaging system 54 that images a part 56 of the surface of a moving object 58 onto the input plane 14 of a displacement sensor 10 also shown in FIG. 1. The object 58 is illuminated with a collimated laser beam 60 so that the velocity component along the intersection of the input plane 14 and the plane of FIG. 28 determined at the input plane 14 is the magnification ratio of the imaging system 54 times the corresponding velocity component of the surface 56.

Figure 29:
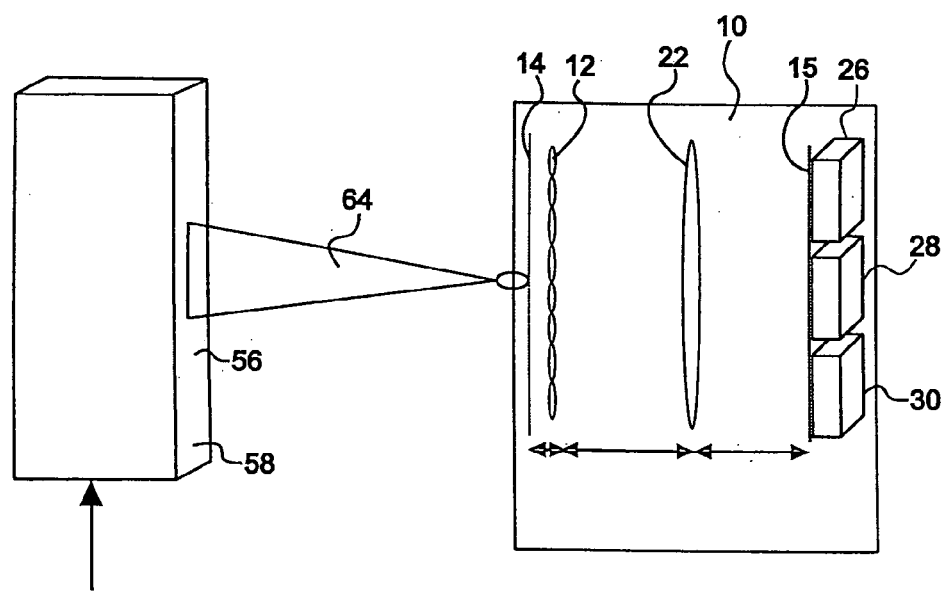

FIG. 29 schematically illustrates a displacement sensor system 62 that differs from the displacement sensor system shown in FIG. 28 in that the system 62 does not have an imaging system 54 and that the object 58 is illuminated with a divergent laser beam 64 emanating from a point source, e.g. a VCSEL, positioned at the input plane 14. It is well known in the art that speckle variation displacements at the input plane is twice the corresponding displacements at the surface of the object regardless of the distance between the object and the input plane. Thus, the velocity component along the intersection of the input plane 14 and the plane of FIG. 29 determined at the input plane 14 is two times the corresponding velocity component of the surface 56.

Figure 30:
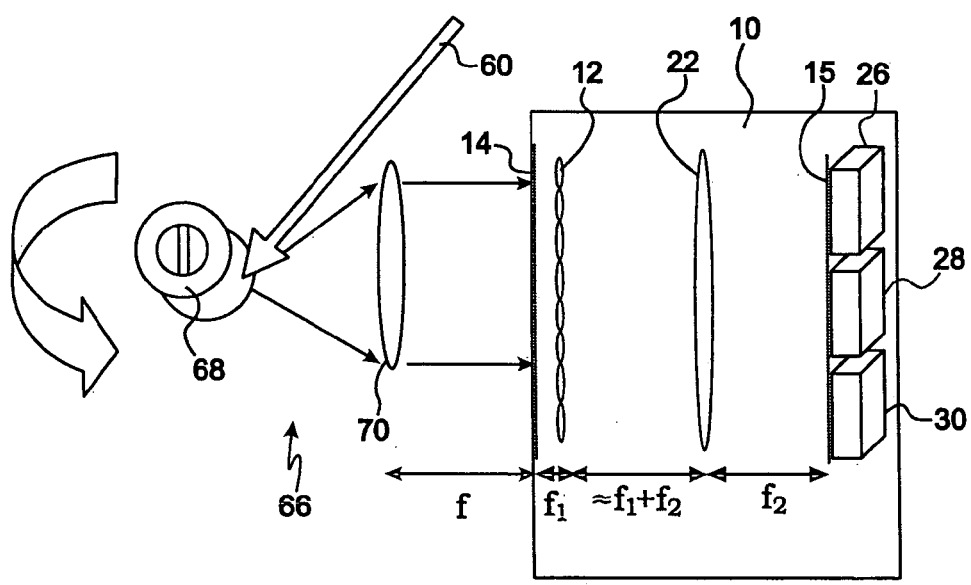

FIG. 30 schematically illustrates yet another displacement sensor system 66 according to the present invention, comprising a Fourier transforming lens 70 positioned so that its Fourier plane, i.e. the back focal plane of lens 70, coincides with the input plane 14 of a displacement sensor 10 also shown in FIG. 1. The object 68 is illuminated with a collimated laser beam 60 and the velocity component of the speckles in the input plane along the intersection of the input plane 14 and the plane of FIG. 18 corresponds to the angular velocity of the object 68.

It should be noted that translational displacement of the object 68 does not lead to translation of speckle variations in the input plane. However, translational displacement of the object 68 will typically lead to speckle boiling.

Figure 31:
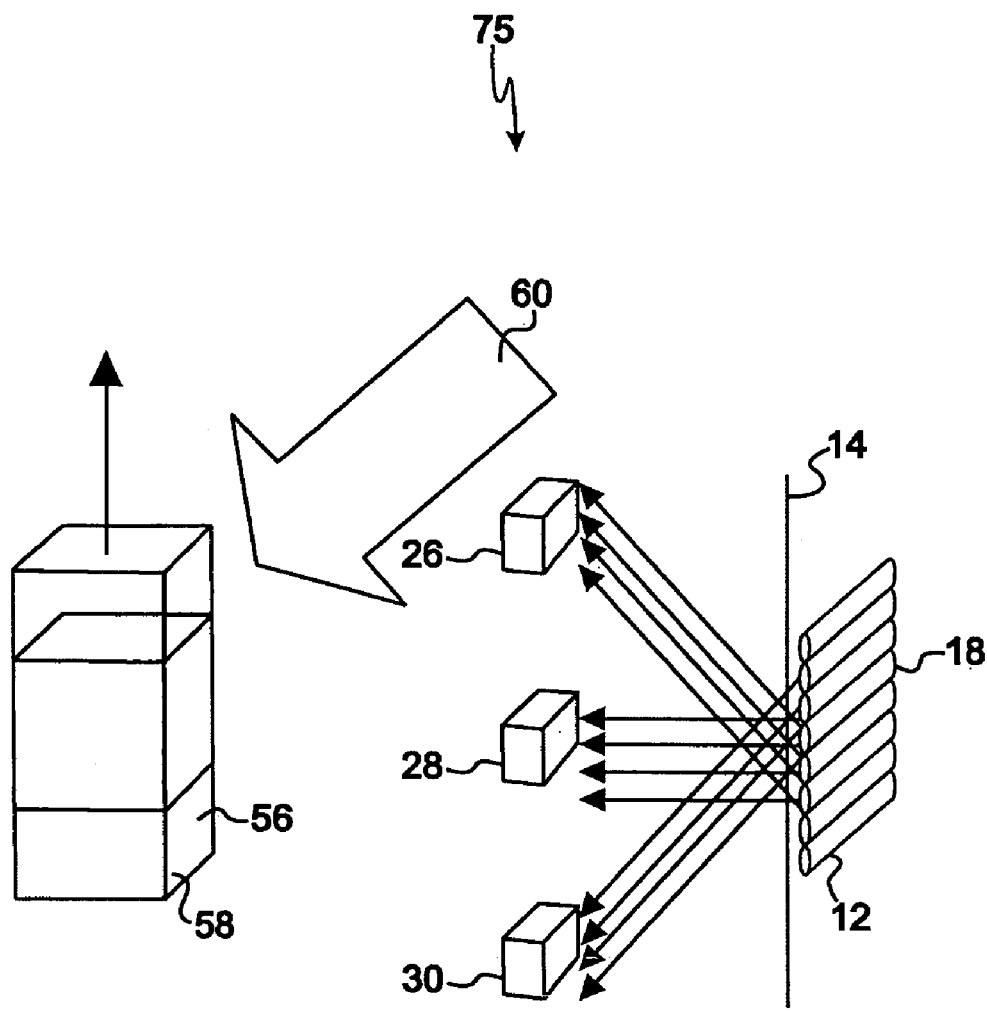

FIG. 31 schematically illustrates a displacement sensor system 75 for determination of linear displacement with a reflecting member 12 comprising a linear array of cylindrical concave mirrors 18 performing an optical function similar to the optical function of the cylindrical lenses shown in e.g. FIG. 1. The displacement sensor operates similar to the operation of the sensor shown in FIG. 3 apart from the fact that the optical member 12 shown in FIG. 31 reflects light while the corresponding optical member 12 shown in FIG. 3 refracts light.

Figure 32:
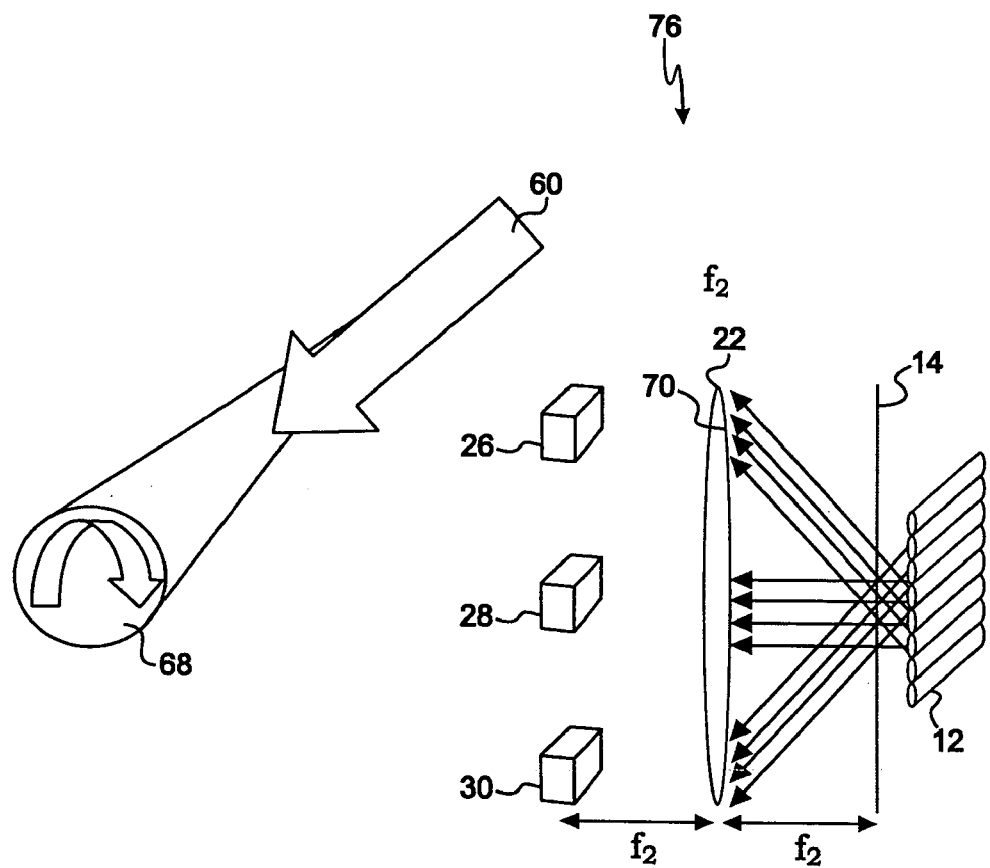

FIG. 32 schematically illustrates another reflection configuration 76 of the present invention for determination of rotational displacement also having a reflecting member 12 comprising a linear array of cylindrical concave mirrors 18. The system illustrated operates similar to the system illustrated in FIG. 30, however, it should be noted that in the system 76, the functions of lenses 22 and 70 of the system illustrated in FIG. 30 are combined into one lens 22.

Figure 33:
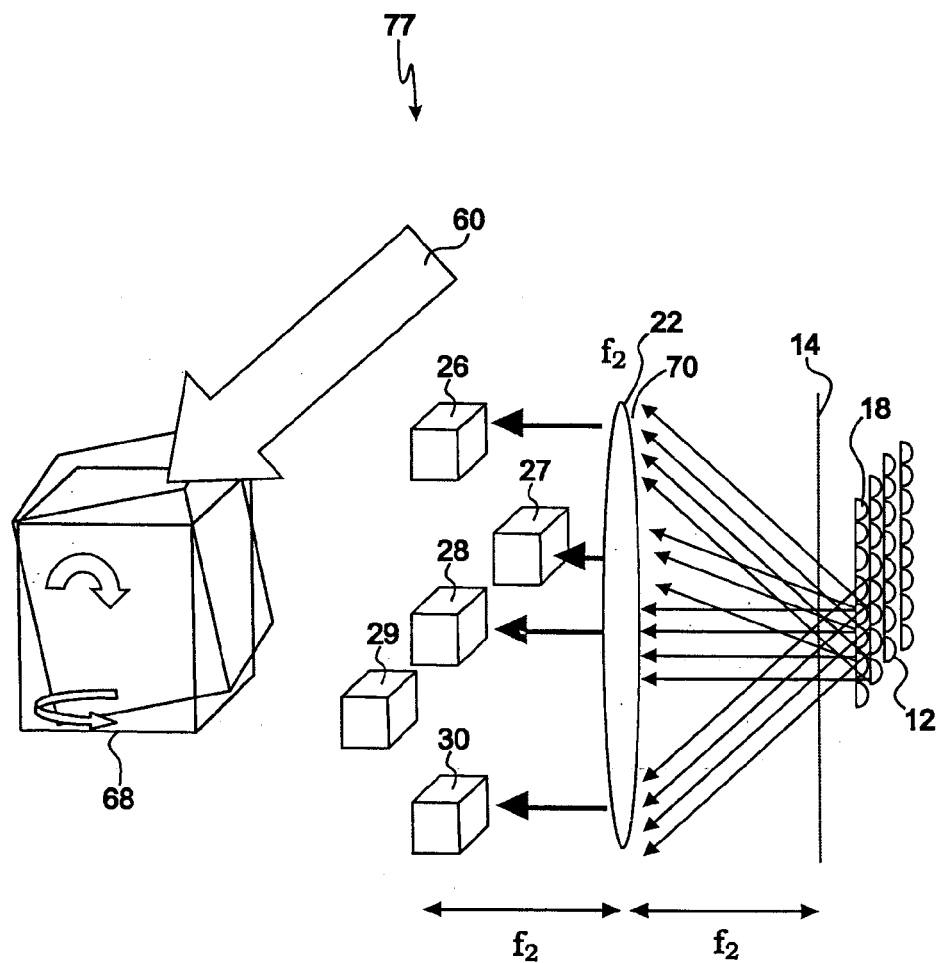

FIG. 33 schematically illustrates a displacement sensor system 77 for determination of rotation in two dimensions. The system 77 is similar to the one-dimensional system 76 illustrated in FIG. 32, however, the linear array of cylindrical concave mirrors has been replaced by a two-dimensional array 12 of spherical concave mirrors 18, and two optical detector elements 27, 29 have been added facilitating detection, in combination with detector element 28, of speckle movement in a direction substantially perpendicular to the direction of movement detected by the combination of optical detector elements 26, 28, 30.

Figure 34:
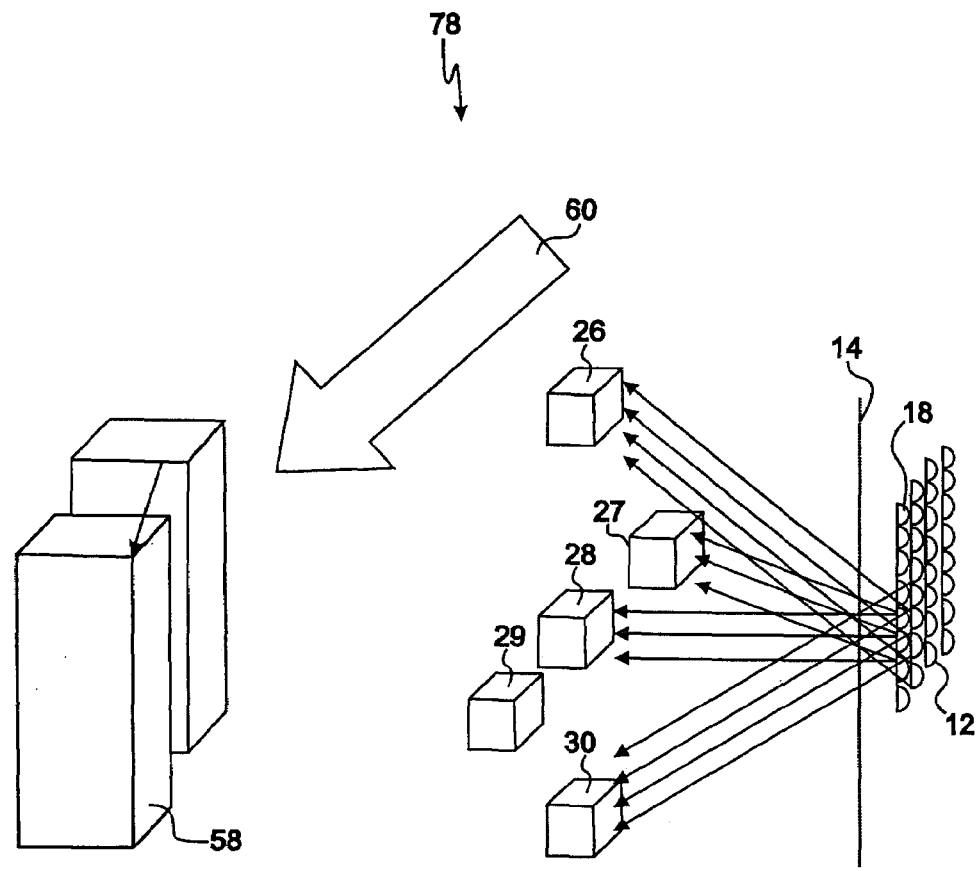

Likewise, FIG. 34 schematically illustrates a displacement sensor system 78 for determination of displacement in two dimensions. The system 77 is similar to the one-dimensional system 75 illustrated in FIG. 31, however, the linear array of cylindrical concave mirrors has been replaced by a two-dimensional array 12 of spherical concave mirrors 18, and two optical detector elements 27, 29 have been added facilitating detection, in combination with detector element 28, of speckle movement in a direction substantially perpendicular to the direction of movement detected by the combination of optical detector elements 26, 28, 30.

Figure 35:
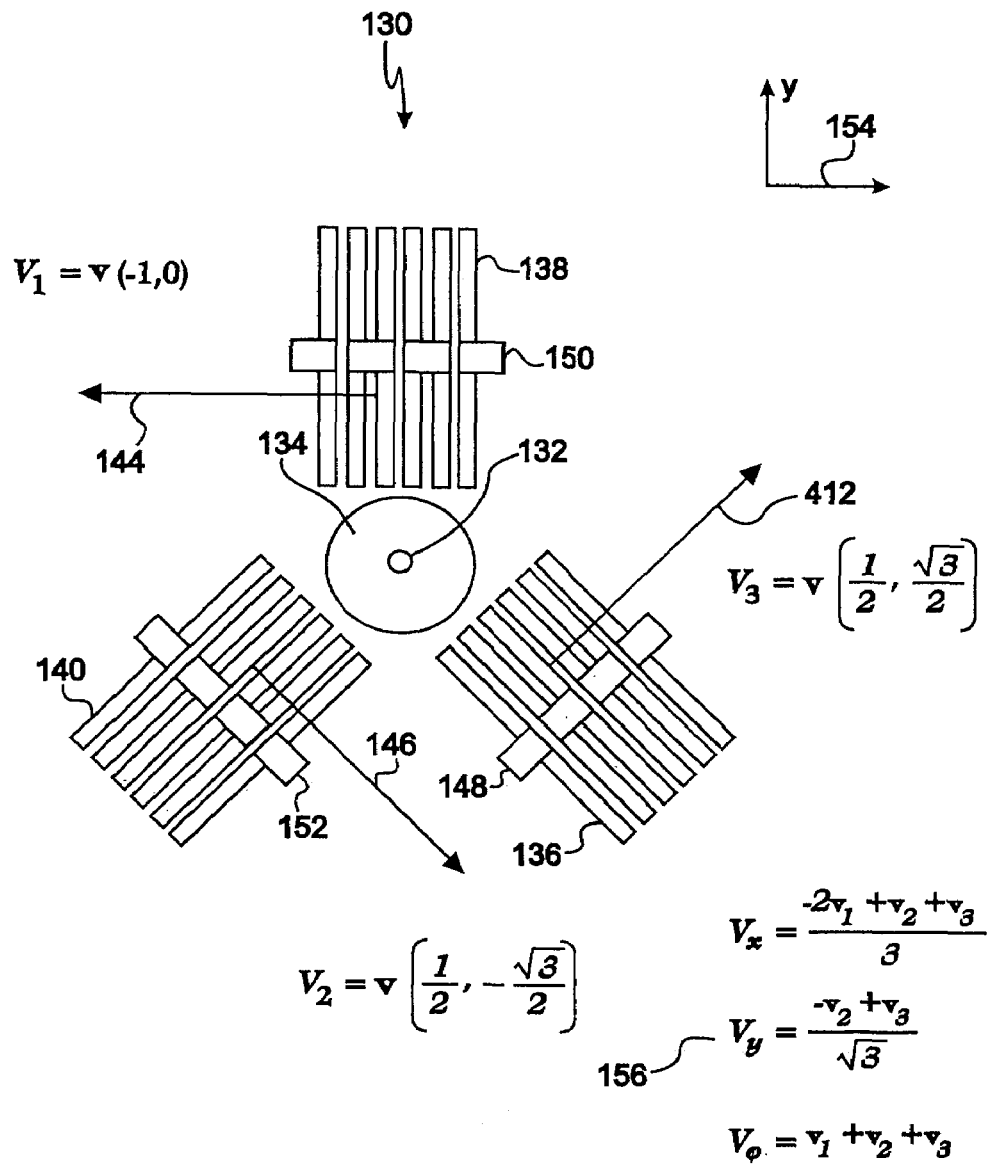

FIG. 35 is a front view of a displacement sensor system 130 for determination of displacement in two dimensions and in-plane rotation, simultaneously. The system 130 comprises a VCSEL 132 positioned behind a collimating lens 134 whereby the object is illuminated by a collimated light beam. Three lenticular cylindrical lens arrays 136, 138, 140 are positioned in a common plane with a mutual angular separation of approximately 120° for determination of velocity components indicated by the respective arrows 142, 144, 146. Detectors 148, 150, 152 are positioned behind the respective lenticular arrays for conversion of received light to an electrical signal.

Velocity components $V_x$ and $V_y$ are defined by the co-ordinate system 154. $V_x$ and $V_y$ and rotational velocity $V_\phi$, are calculated according to the equations 156.

Figure 36:
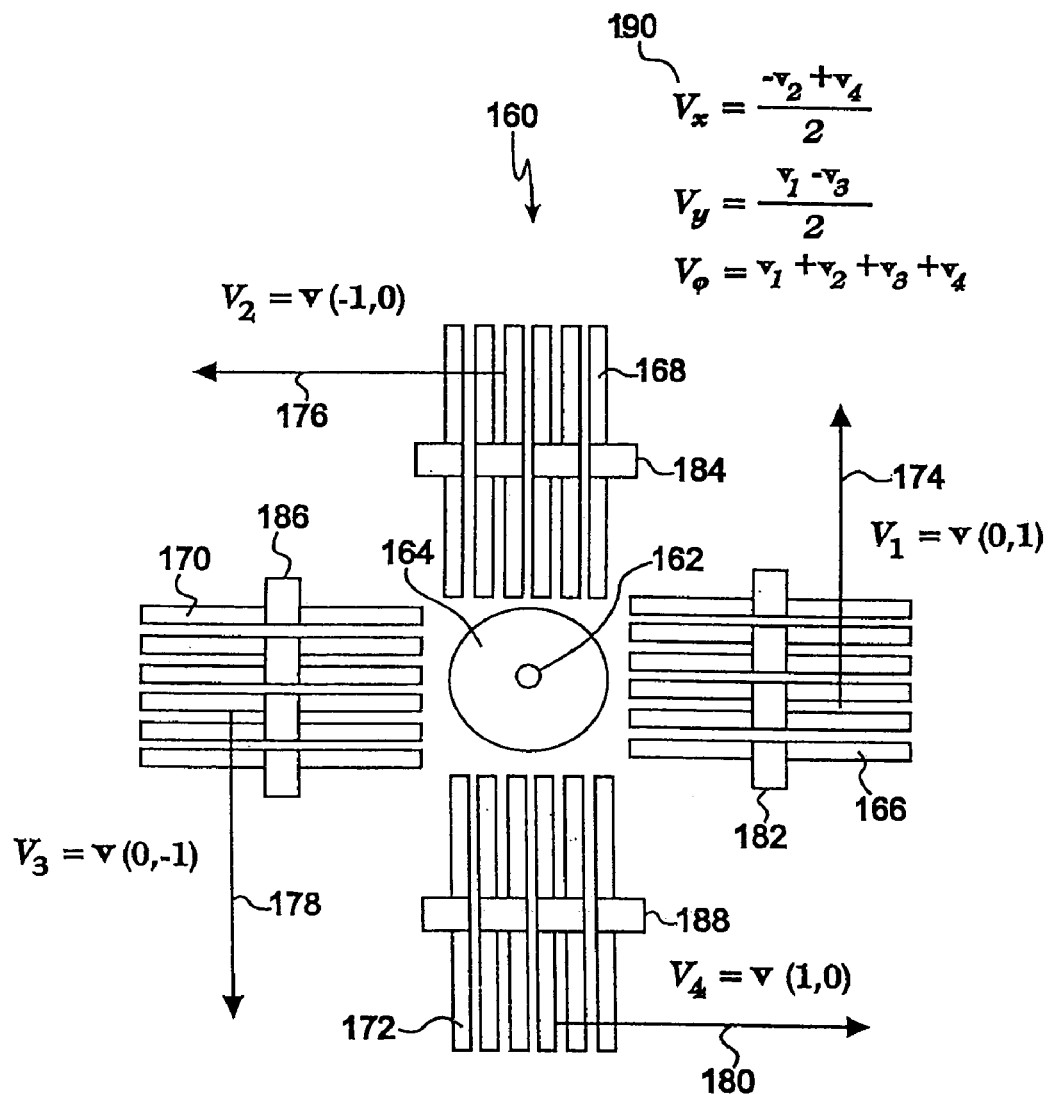

FIG. 36 is a front view of a displacement sensor system 160 for determination of displacement in two dimensions and in-plane rotation, simultaneously. The system 160 comprises a VCSEL 162 in the drawing positioned behind a collimating lens 164 whereby the object is illuminated by a collimated light beam. Four lenticular cylindrical lens arrays 166, 168, 170, 172 are positioned in a common plane with a mutual angular separation of approximately 90° for determination of velocity components indicated by the respective arrows 174, 176, 178, 180. Detectors 182, 184, 186, 188 are positioned behind the respective lenticular arrays for conversion of received light to an electrical signal. Velocity components $V_x$ and $V_y$, and rotational velocity $V_\phi$ are calculated according to the equations 190.

Figure 37:
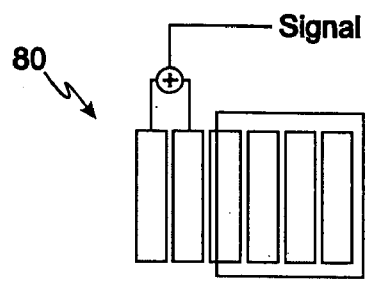
Figure 38:
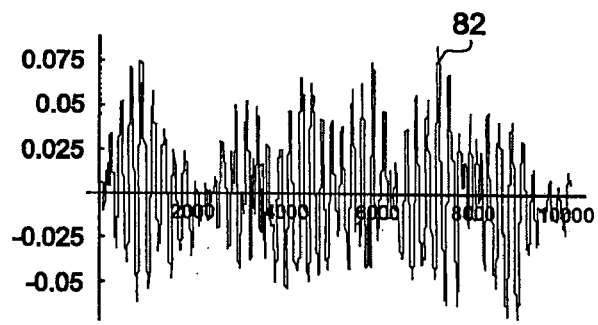
FIG. 38 is a plot of a signal provided by the detector illustrated in FIG. 37.
Figure 39:
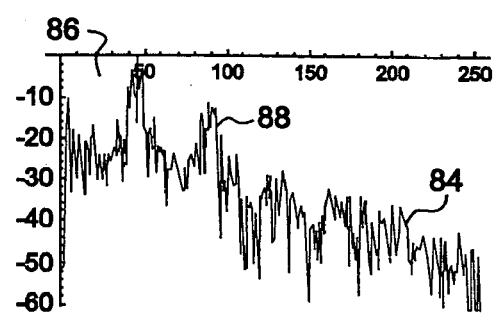
FIG. 39 is a plot of the power spectrum of the signal shown in FIG. 38, FIG. 40 schematically illustrates another detector configuration.
Figure 40:
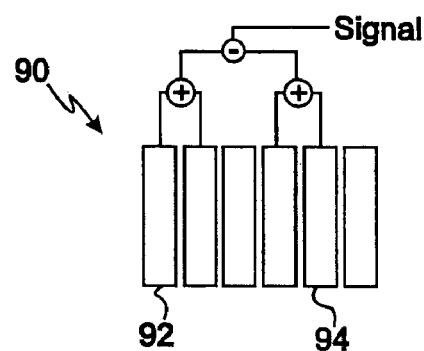
Figure 41:
FIG. 41 is a plot of a signal provided by the detector illustrated in FIG. 40.
Figure 42:
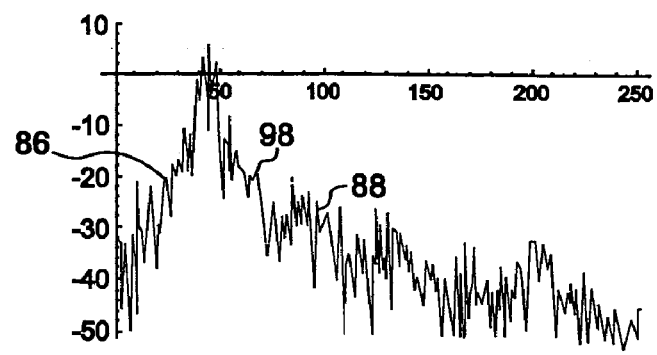
FIG. 42 is a plot of the power spectrum of the signal shown in FIG. 41, FIG. 43 schematically illustrates yet another detector configuration.

FIG. 37 shows a fundamental detector element configuration 80 of an embodiment of the invention. FIG. 38 is a plot of the detector signal 82 and FIG. 39 is a plot of the power spectrum 84 of the detector signal. It should be noted that the low frequency part 86 and the second harmonic 88 of the spectrum 84 are quite significant. The low frequency noise leads to a variation of the running mean value which will introduce significant errors in velocity determinations based on zero-crossing detection. The width of the detector has been selected for optimum suppression of the third harmonic of the fundamental frequency. The detector element is assumed to have a rectangular shape and thus, the power spectrum of the detector function is a sinc-function. In order to eliminate every third harmonic of the detector output signal, the width of each detector element is selected to be substantially equal to one third of the full width of the detector array that is selected to be equal to the width repetitively swept by a speckle traversing the input plane. In FIG. 40, a configuration of two matched detector elements 92, 94 is shown. The distance between the elements corresponds to a phase shift of 180°. The output signals from the detector elements are subtracted for suppression of the low frequency part of the signals and the even harmonic frequencies of the fundamental frequency. The difference signal 96 is plotted in FIG. 41, and the power spectrum 98 is plotted in FIG. 42. The suppression of the low frequency part 86 and the second harmonic 88 is clearly demonstrated by comparison with FIG. 39.

Figure 43:
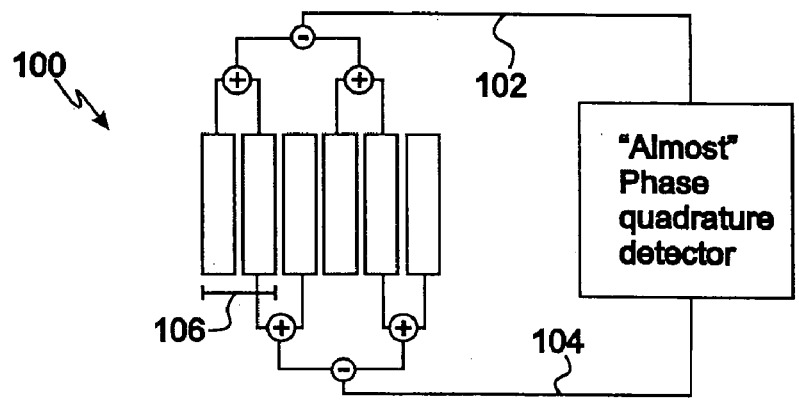
Figure 44:
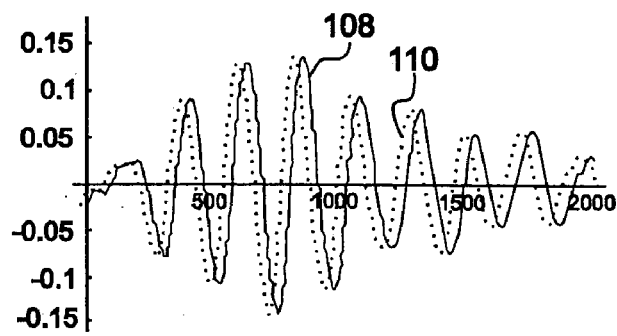
FIG. 44 is a plot of a signal provided by the detector configuration illustrated in FIG. 43.
Figure 45:
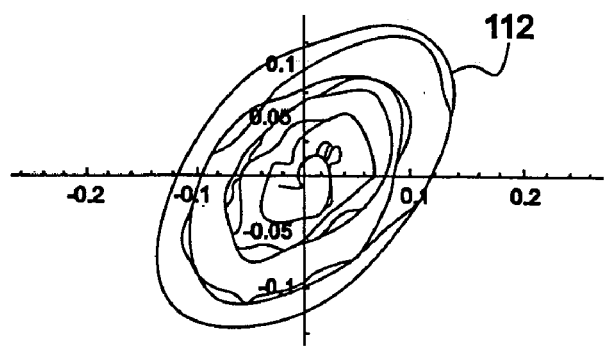
FIG. 45 is a phase plot of the signal shown in FIG. 44, FIG. 46 schematically illustrates still another detector configuration.

An almost-phase-quadrature detector configuration 100 is shown in FIG. 43, wherein six detectors of equal size form two subtracted signals 102, 104. The two subtracted signals 102, 104 are 60 degrees out of phase, and therefore suitable for determination of e.g. direction of the speckle translation or sub-radian phase resolution. In this configuration 100, an exact phase quadrature can not be achieved without changing the detector width 106 thereby reducing the suppression of the third harmonic. The subtracted almost-phase-quadrature signals 108, 110 are plotted in FIG. 44, and FIG. 45 is a phase plot 112 of the signals 108, 110. The phase plot 112 has an elliptical shape which facilitates determination of the direction of the speckle translation and eventually sub-radian measurement accuracy. However, due to the elliptically shape of the phase plot this configuration will be noise sensitive.

Figure 46:
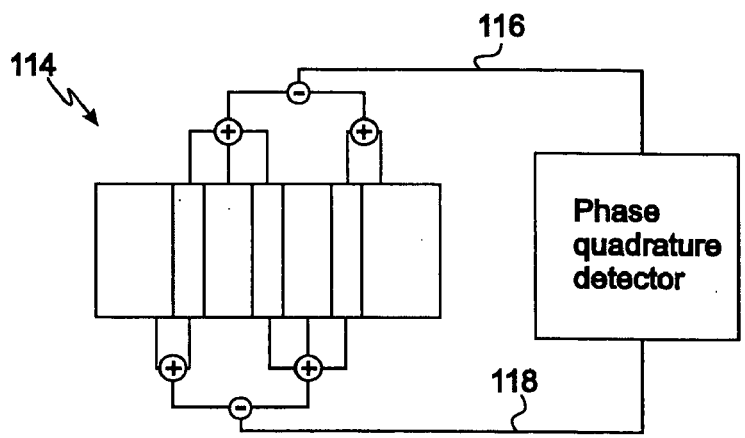
Figure 47:
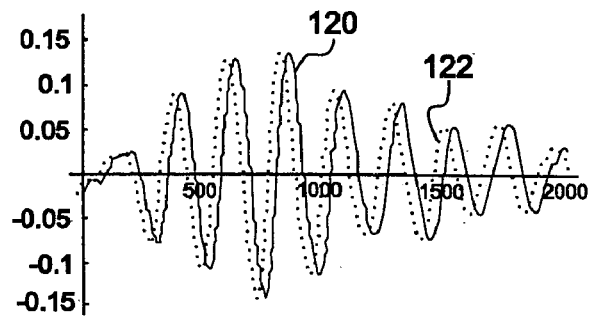
FIG. 47 is a plot of a signal provided by the detector illustrated in FIG. 46.
Figure 48:
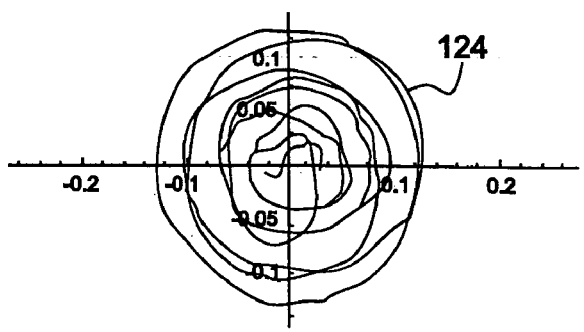
FIG. 48 is a phase plot of the signal shown in FIG. 47, FIG. 49 schematically illustrates a miniaturized embodiment of the invention, FIG. 50 schematically illustrates another miniaturized embodiment of the invention, FIG. 51 schematically illustrates an embodiment with common transmitting and receiving optics, FIG. 52 schematically illustrates the operating principle of the embodiment shown in FIG. 51.

The detector configuration 114 shown in FIG. 46 provides a substantially exact phase-quadrature detector arrangement. Seven detectors of three different sizes form two subtracted signals 116, 118. The two signals 116, 118 are 90 degrees out of phase and therefore facilitate determination of direction of object velocity and sub-radian phase resolution. FIG. 47 is a plot of the subtracted phase-quadrature signals 120, 122, and FIG. 48 is the corresponding phase plot 124. The phase plot 124 is circular facilitating determination of the direction of the object velocity and sub-radian measurement accuracy. The circular shape of the traces in the phase plot makes this configuration less sensitive to noise.

Figure 49:
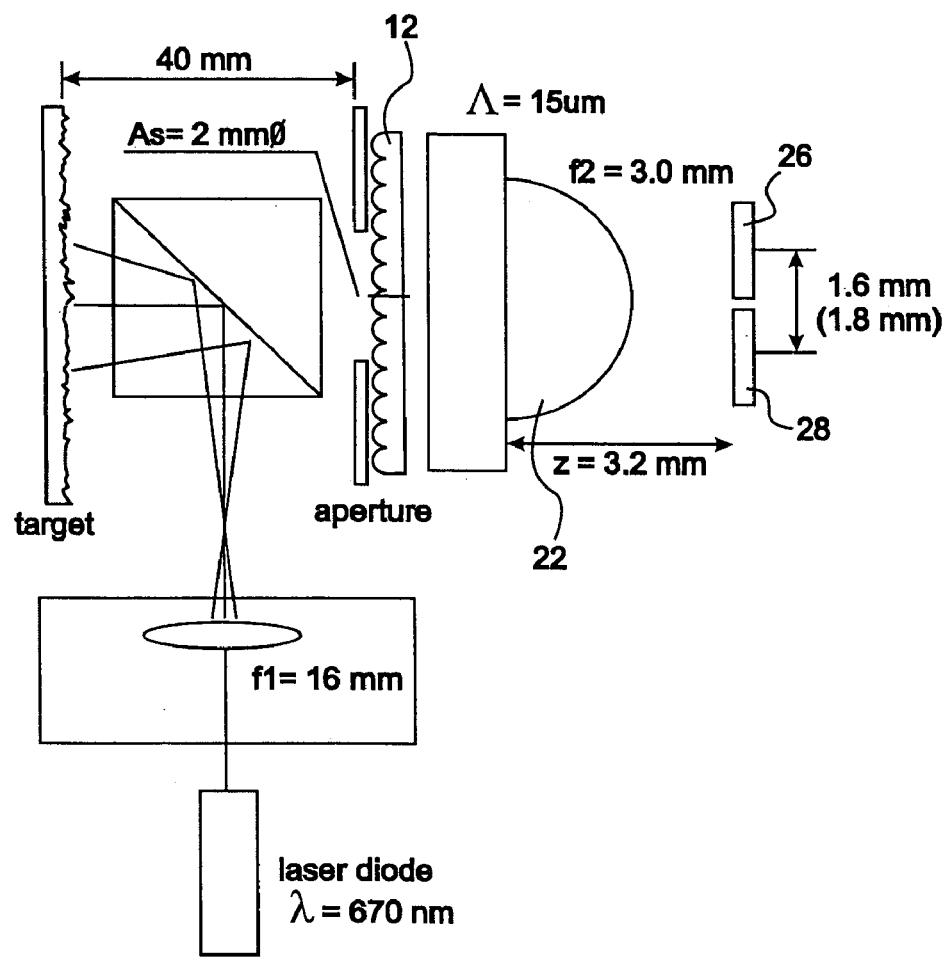
Figure 50:
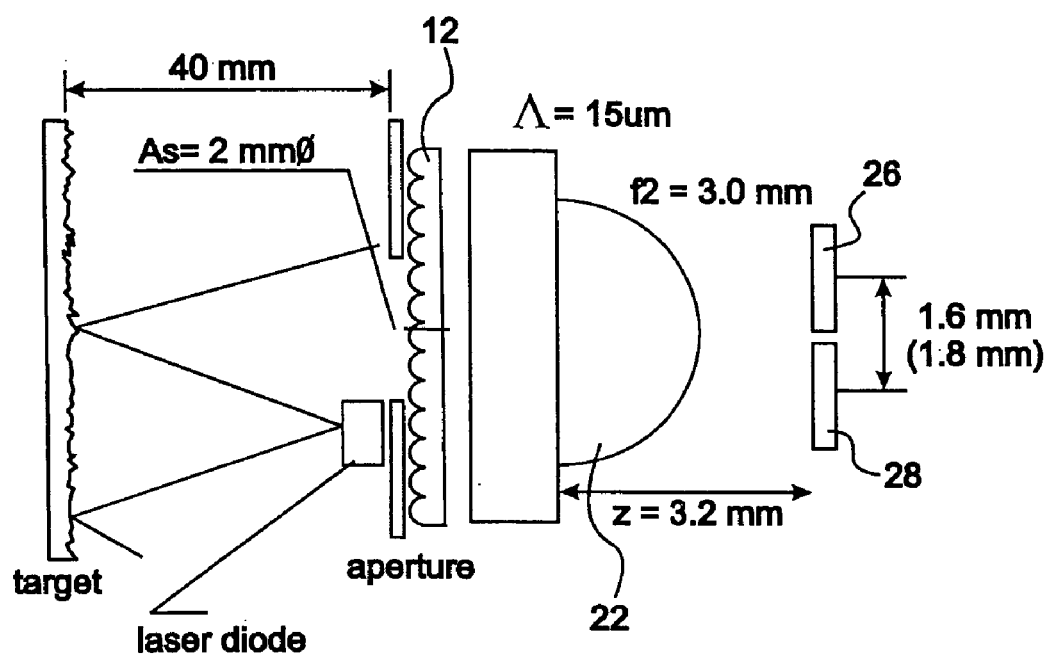

FIGS. 49 and 50 show preferred miniaturized embodiments of the present invention. The working distance between the input plane and the target surface is 40 mm. The pitch of the cylindrical lens array is 30 µm and the focal length is 38.7 µm. The distance between detector elements 26, 28 is 1.6 mm, and the distance between the lens 22 and the detector elements 26, 28 is 3.2 mm.

In the following and with reference to FIGS. 51–54, an embodiment 200 of the invention is disclosed, wherein the optical member 12 is a cylinder lens array 12 and is utilized both for transmission of coherent light towards the object 204 and for reception of light emanating from the object 204. In the embodiment, the light beam emitted from the VCSEL 202 is collimated by the lens 22 and divided into a plurality of beams by the cylinder lens array 12 for illumination of the object 204. This leads to two significant advantages: 1) The signal caused by the speckles are modulated by the plurality of beams whereby the speckle spectrum is concentrated in a frequency range that is optimized for the system. 2) Safety classification of the system will be based on the power in each of the individual beams.

In many applications direct access to the emitted radiation may pose a problem since the wavelength is in the near infrared region (app. 850 nm), where the safety regulations are most severe. This is due to the fact that the eye is able to focus the radiation on the retina, yet the sensitivity of the eye is extremely low in this wavelength region. This means that a damaging radiation could occur without proper warning from the sensory system, i.e. the visual impact. Therefore this issue is of vital importance for the user of laser-based systems, especially in consumer products.

The laser safety standard: "Safety of laser products, Part 1, IEC 60825-1, Ed. 1.1, 1998-01 describes the main safety hazard for the visible and near infrared region to retinal damage. A maximum permissible emission level (AEL) is assigned for a particular class of laser products. The lowest class for laser products is Class 1. It is desired that laser-based products for the consumer market fall within class 1.

For a 850 nm collimated light beam having a diameter of 1 mm, the AEL is 0.24 mW below which no retinal damage is foreseen. However for most applications this is insufficient for generation of acceptable signals.

Figure 54:
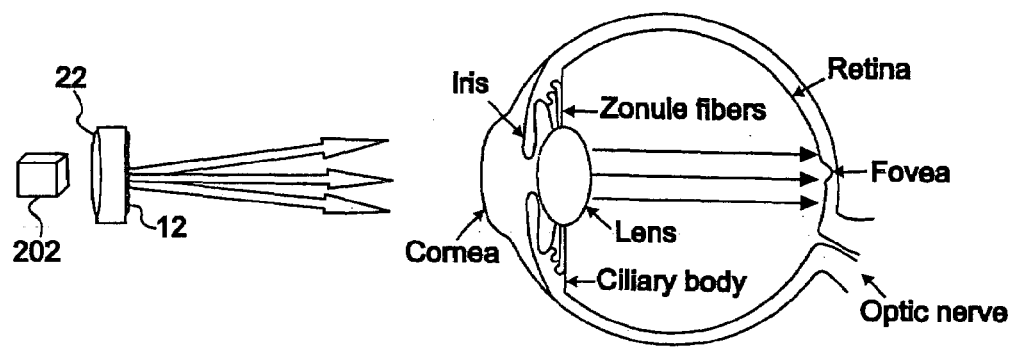
FIG. 54 illustrates (unintentional) illumination of the human eye by the embodiment shown in FIG. 51.

However, with the illustrated embodiment, a VCSEL 202 emits a 850 nm light beam with a diameter of 0.4 mm. The diffraction-limited spot at the retina is app. 0.12 mm provided that the diameter of the eye is app. 50 mm. When collimated light beams are emitted, as schematically illustrated in FIG. 54, with an angular separation of app. 3°, separate spots are formed on the retina with a mutual distance of app. 2.5 mm. There is substantially no spot overlap, and therefore the AEL maximum requirement should be fulfilled for each of the individual spots. However, the total power emitted by the VCSEL may be several times the AEL value.

Figure 51:
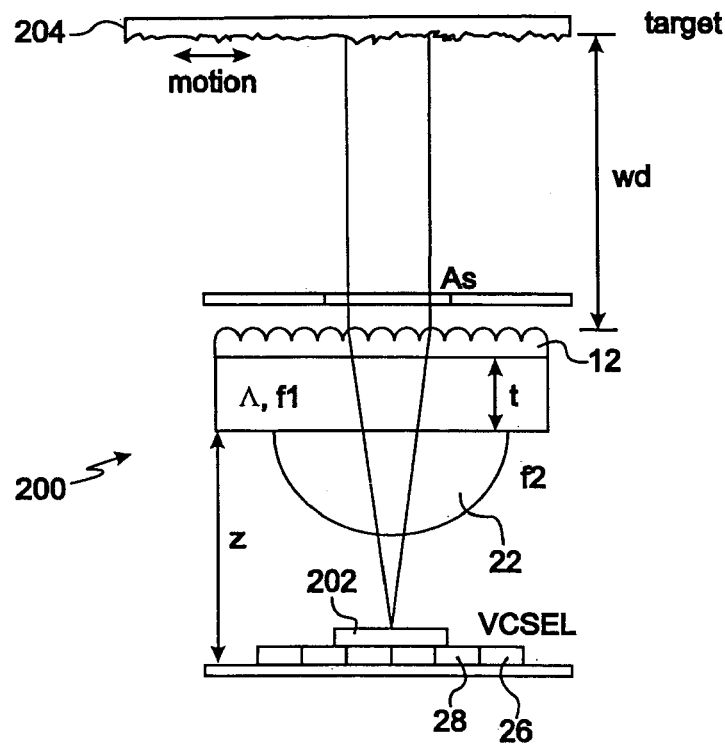
Figure 52:
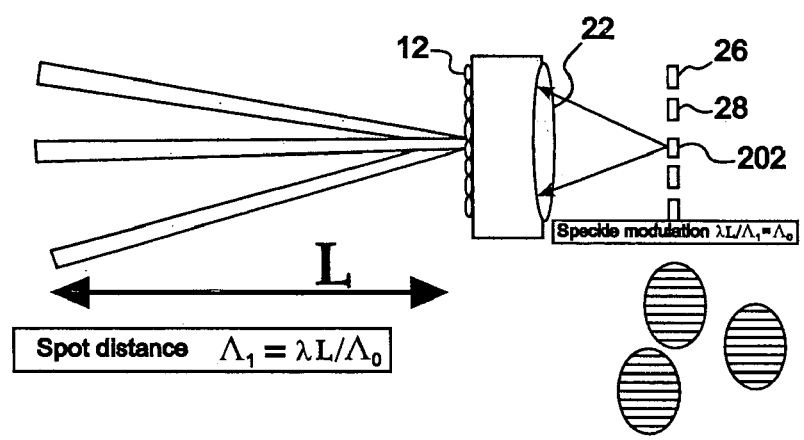
Figure 53:
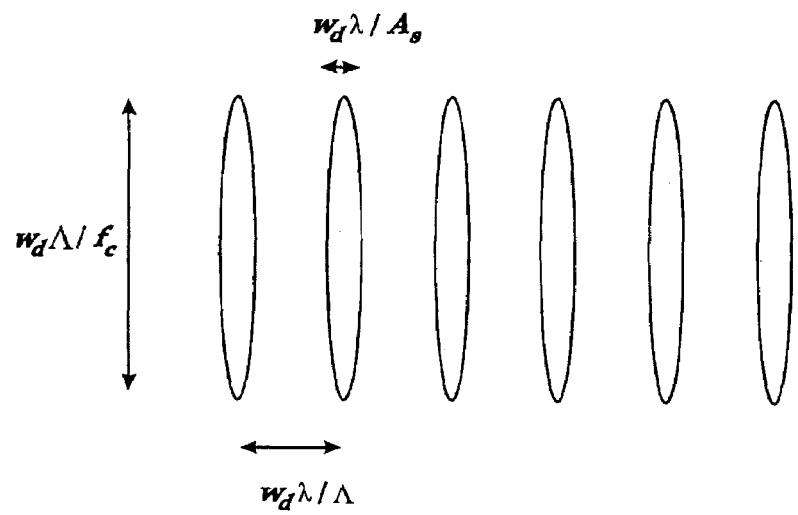
FIG. 53 illustrates the intensity distribution at the surface of an object illuminated by the embodiment shown in FIG. 51.

By illumination of the object with a plurality of beams, the speckles are modulated with a periodic structure that matches the periodic structure of the lens array. This causes a Moiré-like effect with an expected stronger signal as a result. The embodiment is schematically illustrated in FIG. 51. The intensity distribution at the illuminated object 204 is illustrated in FIG. 53 with the following parameters:

$A_s$ is the aperture diameter at the lens array position
$w_d$ is the distance to the object
$\lambda$ is the wavelength of the emitted light
$\Lambda_0$ is the width of the individual lenses in the array, i.e. the pitch of the array.
$f_c$ is the focal length of the lens array.

For an embodiment with $A_s=1$ mm, $w_d=3$ mm, $\lambda=1$ µm, $\Lambda_0=15$ µm, and $f_c=30$ µm, the horizontal spot separation is 200 µm and the spot height is 1.5 mm. The speckle spectrum at the lens array will exhibit a peak at a spectral position given by the product of the wavelength and the distance from the object to the lens array divided by the spot separation as given by the expression in FIG. 53.

For determination of two-dimensional movement two perpendicularly overlapping lens arrays may be provided in the light path.

The invention claimed is:

1. An optical displacement sensor system for detection of displacement of an object, comprising:
    a coherent light source for illumination of at least part of the object with spatially coherent light;
    an optical detector with at least one optical detector element for conversion of an optical signal into a corresponding electronic signal; and
    an optical member with at least three optical elements for mapping of different specific areas of an input plane receiving light emanating from the object onto substantially a same area of the optical detector, thereby generating an oscillating electronic signal having a frequency corresponding to velocity of the object.

2. A system according to claim 1, wherein the optical member is a repetitive optical member comprising substantially identical optical elements.

3. A system according to claim 2, wherein the optical elements are lenses.

4. A system according to claim 3, wherein the optical elements are cylindrical lenses.

5. A system according to claim 3, wherein the optical elements are spherical lenses.

6. A system according to claim 3, wherein the optical elements are Fresnel lenses.

7. A system according to claim 2, wherein the optical elements are formed by a linear phase grating with a sinusoidal modulation of substrate thickness.

8. A system according to claim 2, wherein the optical elements are prisms.

9. A system according to claim 2, wherein the optical elements are prism stubs.

10. A system according to claim 2, wherein the optical member is a diffractive optical element.

11. A system according to claim 2, wherein the optical elements reflect light.

12. A system according to claim 2, wherein the optical member is a linear array of optical elements.

13. A system according to claim 1, wherein the optical member is a two-dimensional array.

14. A system according to claim 1, wherein the coherent light source is a laser.

15. A system according to claim 1, further comprising a system for mapping light emanating from the optical member with a specific angle onto a specific location at the at least one optical detector element.

16. A system according to claim 15, wherein the optical member and the system for mapping are merged into a single physical component.

17. A system according to claim 1, further comprising a Fourier transforming lens having a Fourier plane, the Fourier transforming lens positioned between the object and the input plane so that the input plane is positioned at the Fourier plane of the Fourier transforming lens whereby rotational displacement of the object is determinable.

18. A system according to claim 1, wherein the coherent light source is a point source, and the object is illuminated by a divergent beam of light emitted by the point source positioned substantially at the input plane.

19. A system according to claim 1, wherein a collimated beam of light illuminates the object.

20. A system according to claim 1, wherein an average size of speckles formed on the input plane is substantially identical to a size of an optical element.

21. A system according to claim 1, wherein the coherent light source illuminates the optical member to form a plurality of light beams that illuminate the object.

22. A system according to claim 1, wherein the coherent light source is a collimated light source that illuminates the optical member.

23. A system according to claim 1, further comprising a plurality of optical members positioned in a substantially common plane and a plurality of respective optical detectors, wherein each of the optical members maps different specific areas of the input plane onto substantially the same area of the respective optical detectors for determination of displacement in two directions.

24. A system according to claim 1, wherein a width of the at least one optical detector element is set for optimum suppression of a third harmonic of a fundamental frequency of a detector signal output therefrom.

25. A system according to claim 1, wherein the optical detector comprises a first set of two matched optical detector elements with a mutual distance corresponding to a phase shift of substantially 180° of a fundamental frequency.

26. A system according to claim 25, wherein the optical detector further comprises a second set of two matched optical detector elements with a mutual distance corresponding to a phase shift of substantially 180°, a phase of a difference signal between the first and second sets having a mutual distance corresponding to a phase shift of substantially 60°.

27. A system according to claim 25, wherein the optical detector further comprises a second set of two matched optical detector elements with a mutual distance corresponding to a phase shift of substantially 180°, a phase of a difference signal between the first and second sets having a mutual distance corresponding to a phase shift of substantially 90°.

28. A system according to claim 1, further comprising a separate set of optical detector elements that is displaced in relation to the at least one optical detector element, for provision of an output signal that is statistically independent of an output signal of the at least one optical detector element, whereby influence of lack of signal due to signal drop out is minimized.

* * * * *